(12) United States Patent
Bai et al.

(10) Patent No.: US 11,363,649 B2
(45) Date of Patent: Jun. 14, 2022

(54) METHODS AND APPARATUS TO FACILITATE RELAYED UPLINK TRANSMISSIONS

(71) Applicant: QUALCOMM Incorporated, San Diego, CA (US)

(72) Inventors: Tianyang Bai, Bridgewater, NJ (US); Jung Ho Ryu, Fort Lee, NJ (US); Vasanthan Raghavan, West Windsor Township, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 105 days.

(21) Appl. No.: 16/840,139

(22) Filed: Apr. 3, 2020

(65) Prior Publication Data
US 2020/0351889 A1    Nov. 5, 2020

Related U.S. Application Data

(60) Provisional application No. 62/841,685, filed on May 1, 2019.

(51) Int. Cl.
*H04W 76/10* (2018.01)
*H04W 72/04* (2009.01)
(Continued)

(52) U.S. Cl.
CPC .......... *H04W 76/10* (2018.02); *H04L 1/0061* (2013.01); *H04W 72/0413* (2013.01);
(Continued)

(58) Field of Classification Search
CPC ......... H04W 72/0493; H04W 72/0413; H04W 72/14; H04W 72/1268; H04W 76/10; H04W 76/14; H04W 88/04; H04L 1/0061
See application file for complete search history.

(56) References Cited

U.S. PATENT DOCUMENTS 9,161,288 B2 * 10/2015 Cho ...................... H04W 40/02
10,172,029 B1 * 1/2019 Oroskar .................... H04L 1/08
(Continued)

FOREIGN PATENT DOCUMENTS

| GB | 2493785 A | 2/2013 |
|---|---|---|
| WO | 2016163762 A1 | 10/2016 |
| WO | 2017065895 A1 | 4/2017 |

OTHER PUBLICATIONS

Interdigital Inc: "Physical Layer Procedures for NR V2X Sidelink", 3GPP Draft, 3GPP TSG RAN WG1 Ad-Hoc Meeting 1901, R1-1900794, Physical Layer Procedures for NR V2X Sidelink, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593640, 10 pages, Retrieved from the Internet: URL: http://www.3gpp.org/ftp/Meetings%5F3GPP%5FSYNC/RAN1/Docs/R1%2D1900794%2Ezip [retrieved on Jan. 20, 2019] the whole document.

(Continued)

*Primary Examiner* — Min Jung
(74) *Attorney, Agent, or Firm* — ArentFox Schiff LLP

(57) ABSTRACT

Apparatus, methods, and computer-readable media for facilitating relayed uplink transmissions are disclosed herein. An example method for wireless communication at a first device includes receiving an uplink transmission from a second device. The example method also includes relaying the uplink transmission to a base station, and providing an indication that the second device is an originating source of the uplink transmission when relaying the uplink transmission to the base station.

30 Claims, 15 Drawing Sheets

(51) Int. Cl.
*H04W 72/14* (2009.01)
*H04W 72/12* (2009.01)
*H04L 1/00* (2006.01)

(52) U.S. Cl.
CPC ... *H04W 72/0493* (2013.01); *H04W 72/1268* (2013.01); *H04W 72/14* (2013.01)

(56) References Cited

U.S. PATENT DOCUMENTS

| | | | |
|---|---|---|---|
| 11,096,083 B2* | 8/2021 | Lee | H04W 76/14 |
| 2018/0069618 A1* | 3/2018 | Loehr | H04W 72/1263 |
| 2018/0077608 A1 | 3/2018 | Jung et al. | |
| 2018/0167986 A1* | 6/2018 | Lin | H04W 76/22 |
| 2019/0014490 A1* | 1/2019 | Kim | H04W 24/02 |
| 2019/0014606 A1* | 1/2019 | Li | H04W 28/0278 |
| 2019/0341968 A1* | 11/2019 | Wang | H04W 84/18 |
| 2020/0296745 A1* | 9/2020 | Inokuchi | H04W 72/121 |
| 2020/0344665 A1* | 10/2020 | Liao | H04W 8/005 |

OTHER PUBLICATIONS

International Search Report and Written Opinion—PCT/US2020/026921—ISA/EPO—dated Jul. 7, 2020 (192429WO).

* cited by examiner

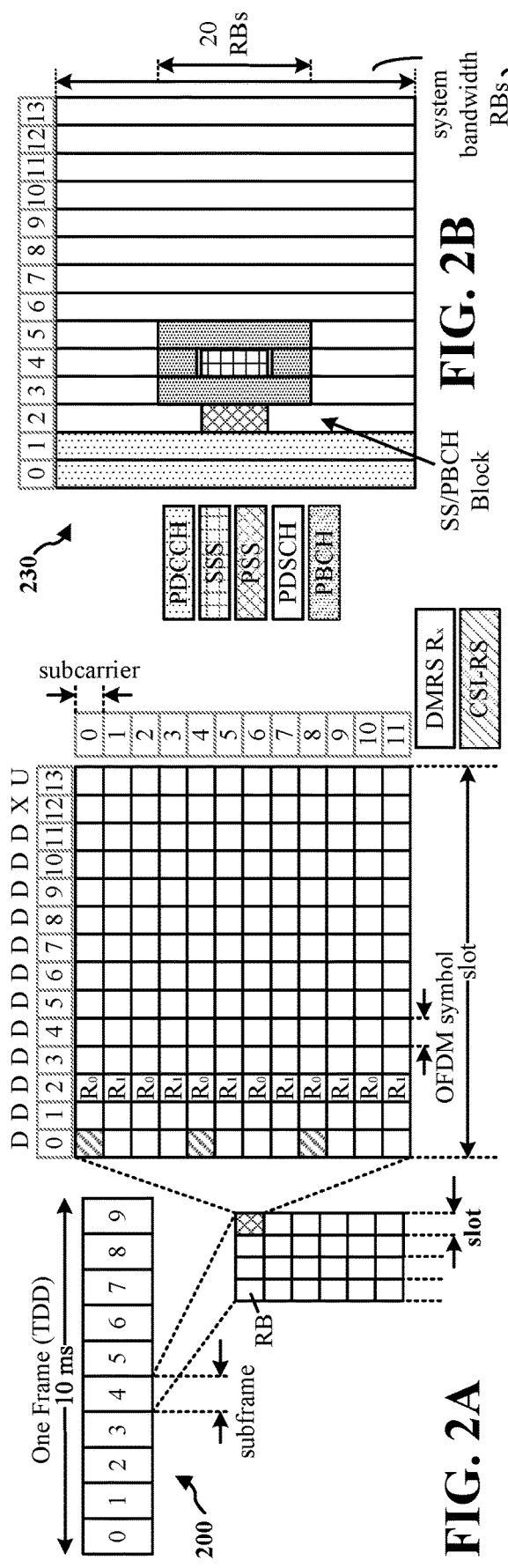
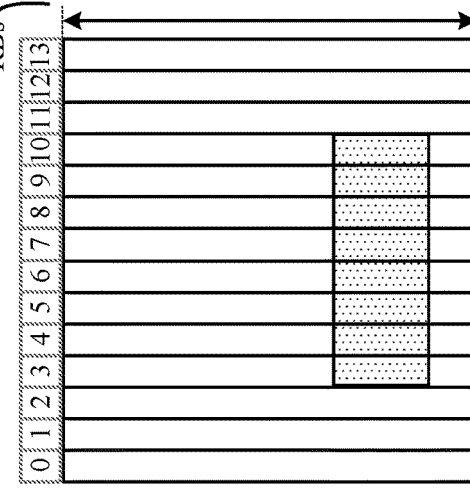
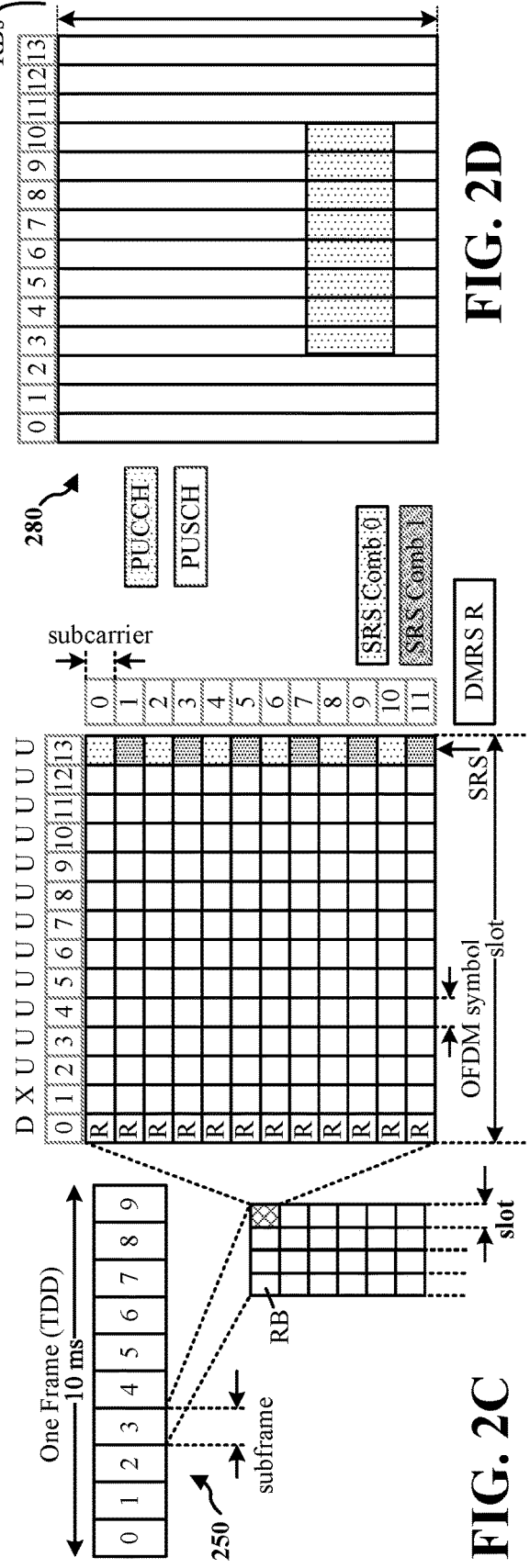

METHODS AND APPARATUS TO FACILITATE RELAYED UPLINK TRANSMISSIONS

CROSS REFERENCE TO RELATED APPLICATION(S)

This application claims the benefit of U.S. Provisional Patent Application Ser. No. 62/841,685, entitled "Methods and Apparatus to Facilitate Relayed Uplink Transmissions" and filed on May 1, 2019, which is expressly incorporated by reference herein in its entirety.

BACKGROUND

Technical Field

The present disclosure relates generally to communication systems, and more particularly, to wireless communication involving relay user equipment.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus for wireless communication at a first device includes receiving an uplink transmission from a second device. The example apparatus also includes relaying the uplink transmission to a base station. The example apparatus further includes providing an indication that the second device is an originating source of the uplink transmission when relaying the uplink transmission to the base station.

In another aspect of the disclosure, a method, a computer-readable medium, and an apparatus are provided. An example apparatus for wireless communication at a base station includes receiving an uplink transmission from a first device. The example apparatus also includes determining an originating source of the uplink transmission, and where the originating source is a second device different than the first device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
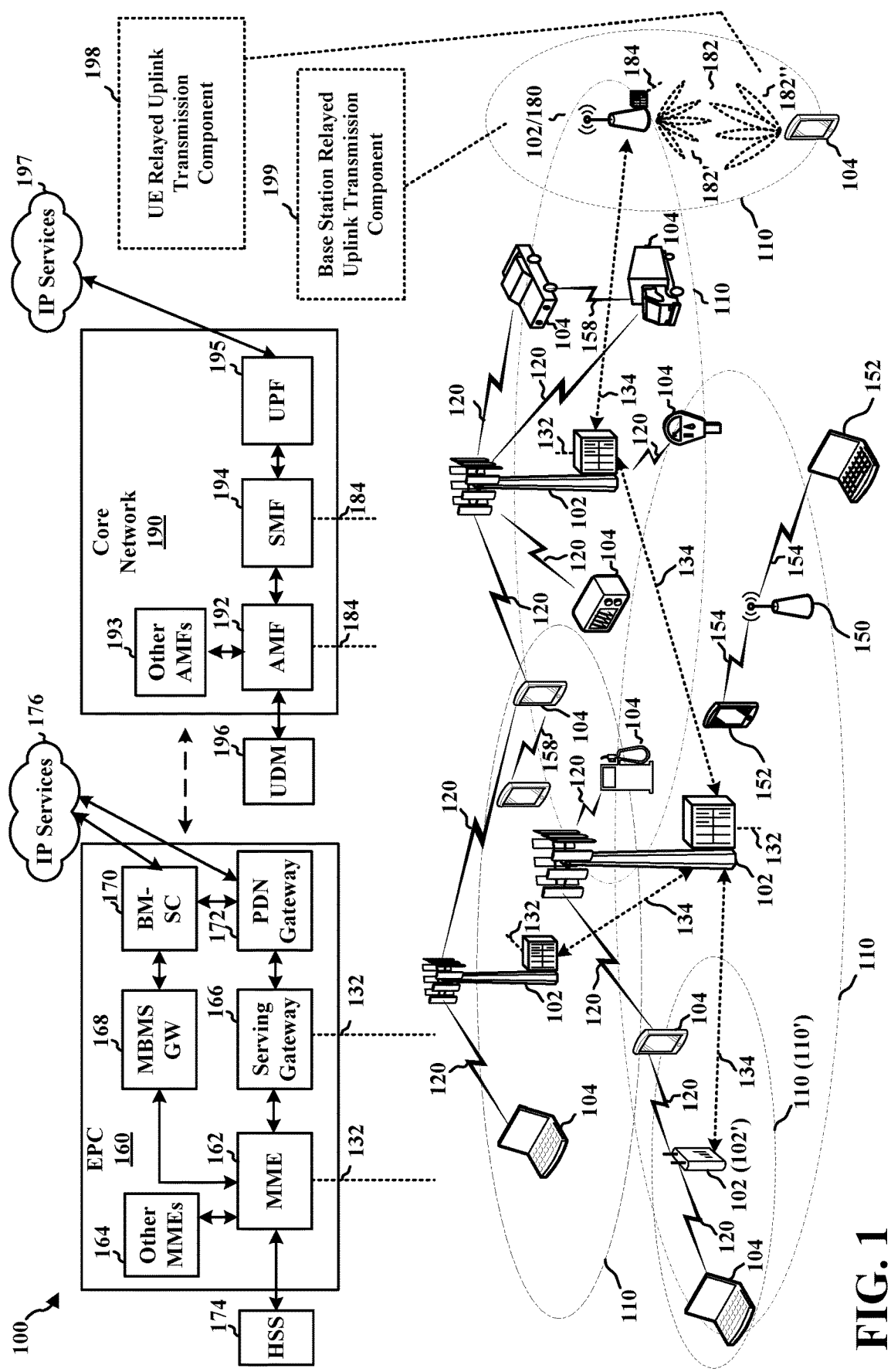
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur do to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MIME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MIME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a device, such as the UE 104, a relay node, an integrated access backhaul (IAB) node, may be configured to manage one or more aspects of wireless communication via relaying uplink transmissions to a base station. As an example, in FIG. 1, the UE 104 may receive an uplink transmission 185 from UE 104' that is directed to base station 102/180. The UE 104 may relay the uplink transmission 185 to the base station 102/180. For example, the UE 104 of FIG. 1 may include a UE relayed uplink transmission component 198 configured to provide an originating source of a relayed uplink transmission to the base station. In an example, the UE relayed uplink transmission component 198 may be configured to receive an uplink transmission from another device, relay the uplink transmission to a base station, and provide an indication that the other device is an originating source of the uplink transmission when relaying the uplink transmission to the base station.

In certain aspects, the base station 102/180 may be configured to manage one or more aspects of wireless communication via relayed uplink transmissions. For example, the base station 102/180 of FIG. 1 includes a base station relayed uplink transmission component 199 configured to facilitate the identifying of the originating source of a received uplink transmission. In an example, the base station relayed uplink transmission component 199 may be configured to receive an uplink transmission from a first device, such as the UE 104, and determine an originating source of the uplink transmission, and where the originating source is a second device, such as the second UE 104', different than the first device, such as the first UE 104.

Although the following description may provide examples based on relayed uplink communications, the concepts described herein may also be applicable to sidelink communications. Furthermore, although the following description may provide examples based on 5G/NR, the concepts described herein may be applicable to other similar areas, such as LTE, LTE-A, CDMA, GSM, and/or other wireless technologies, in which uplink transmissions may be relayed to a base station. Moreover, while the following description provides examples in which the relaying device is a UE, the concepts described herein may be applicable to other devices capable of relaying transmissions, such as relaying nodes and/or IAB nodes.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
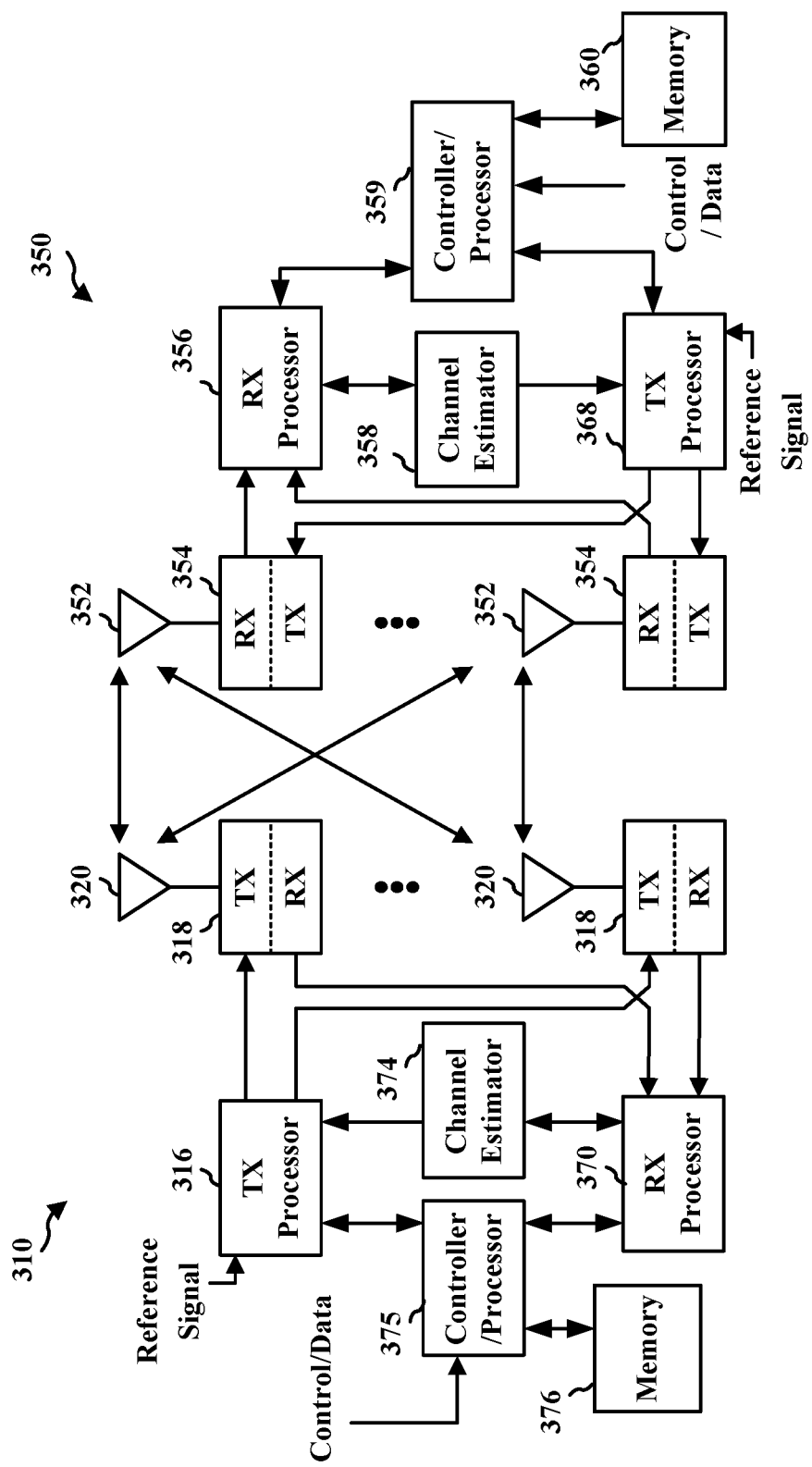
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and/or the controller/processor 359 of the UE 350 may be configured to perform aspects in connection with the UE relayed uplink transmission component 198 of FIG. 1.

At least one of the TX processor 316, the RX processor 370, and/or the controller/processor 375 may be configured to perform aspects in connection with the base station relayed uplink transmission component 199 of FIG. 1.

In mmW communications, downlink transmissions generally have better coverage than uplink transmissions. The reduced coverage for uplink transmissions may be due to one or more factors including, for example, relatively lower transmit powers for UEs compared to base stations and/or relatively greater power saving concerns for UEs compared to base stations. For example, a UE may have to "back-off" or reduce transmit power to save power in some instances (e.g., when the UE has a low battery level). In some examples, the UE may have to "back-off" transmit power for safety concerns (sometimes referred to as a "maximum power emission issue") (e.g., when a human body is exposed near a transmit antenna). Downlink transmissions typically do not have such limitations relating to transmit powers and/or power saving concerns. Accordingly, uplink transmissions and downlink transmissions may not provide the same coverage in one or more use cases. As an example, the UE 104' in FIG. 1 may receive a downlink signal directly from a base station 102/180, yet the base station 102/180 might not accurately receive an uplink signal from the UE 104' due to the reduced coverage of the UE 104'.

One example technique for improving coverage for uplink transmissions includes enabling a different UE, e.g., UE 104, to relay uplink transmissions from the UE 104' to a base station 102/180. For example, a first UE (sometimes referred to as a "relay UE" or a "relay device") may relay uplink transmissions that are received from a second UE (sometimes referred to as an "originating source UE" or an "originating source device") to a base station. In some such examples, the second UE may receive downlink transmissions directly from the base station and/or through a relay UE (e.g., the first UE and/or another relay UE).

However, while the relay UE is relaying uplink transmissions from the originating source UE to the base station, at times, the relay UE may additionally or alternatively transmit its own uplink transmissions to the base station (e.g., uplink transmissions for which the relay UE is the originating source). For example, at a first time, the first UE may be transmitting uplink transmissions (e.g., control and/or data) for which the first UE is the originating source of the uplink transmissions, and at another time, the first UE may be transmitting uplink transmissions (e.g., control and/or data) for which the second UE is the originating source of the uplink transmissions (e.g., the first UE is relaying the uplink transmissions from the second UE to the base station). For example, a base station may transmit a downlink transmission to the first UE and to the second UE and receive ACK/NACK feedback for the downlink transmission from the first UE, but where the originating source of the ACK/NACK feedback may be the first UE or the second UE. Said differently, when the first UE is a relay UE between the second UE and the base station, the base station may receive uplink transmissions for which the first UE is the originating source or for which the second UE is the originating source. Furthermore, the first UE may relay uplink transmission for more than one UE. Accordingly, it may be appreciated that techniques for distinguishing the originating source of the uplink transmission may be beneficial.

As used herein, the term "source" may be the same or different than the term "originating source." For example, when the base station receives the uplink transmission from the first UE, the "source" of the uplink transmission may be the first UE, while the "originating source" of the uplink transmission may be the first UE (e.g., when the first UE is transmitting its own uplink transmission) or the second UE (e.g., when the first UE is relaying an uplink transmission received from the second UE).

Figure 4:
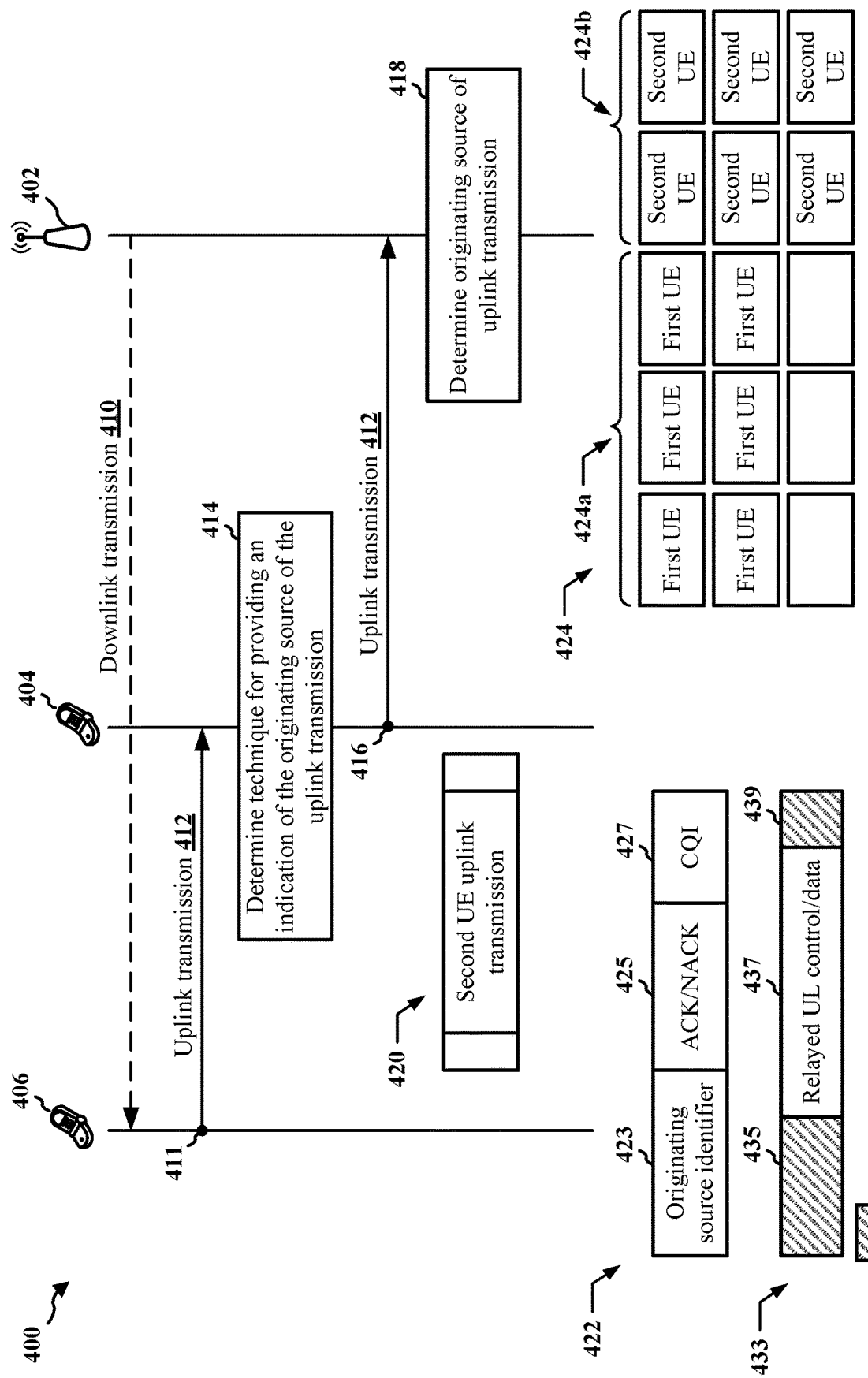
FIG. 4 is a diagram illustrating a call flow diagram between a first UE, a second UE, and a base station.

In some examples, the first UE (e.g., the relay UE) may add a label to the uplink transmission to indicate the originating source of the uplink transmission. For example, the first UE may include additional signaling with the uplink transmission to indicate the originating source of the uplink transmission. In some examples, the additional signaling is information (e.g., one or more bits) added to, for example, a header of the uplink transmission. In another example, information identifying the originating source of the transmission may be appended to the uplink transmission. In another example, information may be included both in the header and appended to the transmission. In FIG. 4, an example relayed transmission 433 is shown having information wrapped around the UL transmission, e.g., included in header 435 and in appended information 439 that is added to the uplink transmission 437. In FIG. 4, an example transmission 422 is illustrated having originating source identifier information 423 added to an uplink transmission. The transmission may include, e.g., an ACK/NACK 425 and/or CQI 427 that originated from the second UE and is relayed by the first UE to the base station. In some examples, the additional signaling is a wrapper added to uplink transmissions for which the first UE is not the originating source of the uplink transmission (e.g., when the first UE is relaying the uplink transmission from a different UE). In some examples, the first UE may transmit the label in a signal (or communication or transmission) separate from the uplink transmission. For example, the label may indicate the originating source for certain upcoming uplink transmissions.

In some examples in which the first UE adds a label to the uplink transmission, the base station receiving the uplink transmission may determine the originating source of the received uplink transmission based on the additional signaling provided in the uplink transmission. For example, the base station may determine the originating source of the received uplink transmission based on information added to the header of the uplink transmission, appended to the uplink transmission, and/or received in a signal separate from the uplink transmission. In some examples, the base station may determine the originating source of the received uplink transmission based on the presence or absence of the additional signaling. For example, if the uplink transmission does not include any additional signaling, then the base station may determine that the first UE is the originating source of the uplink transmission. However, if the uplink transmission does include any additional signaling, then the base station may determine that another UE (e.g., the second UE) is the originating source of the uplink transmission.

In some examples, the additional signaling may explicitly indicate the originating source of the uplink transmission. For example, the additional signaling may indicate that the originating source is the first UE, that the originating source is the second UE, etc. In some examples, the additional signaling may indicate whether the uplink transmission is or is not a relayed uplink transmission and the base station may determine, based on the additional signaling, the originating source of the uplink transmission. For example, if the additional signaling indicates that the uplink transmission is not a relayed uplink transmission, then the base station may determine that the first UE is the originating source of the uplink transmission. However, if the additional signaling indicates that the uplink transmission is a relayed uplink transmission, then the base station may determine, based on, for example, the quantity of other UEs for which the first UE is a relay UE and/or additional provided information (e.g., an identifier associated with another UE), the originating source of the uplink transmission.

In some examples, the size of the additional signaling may vary based on, for example, the quantity of UEs for which the first UE is acting as a relay UE. For example, if the first UE is acting as a relay UE for one other UE, then one bit may be used to distinguish the originating source of an uplink transmission (e.g., the originating source is the first UE or the one other UE). However, if the first UE is acting as a relay UE to more than one other UE, then two or more bits may be used to distinguish the originating source of an uplink transmission.

In some examples, the first UE may use different resources when transmitting the uplink transmission to distinguish the originating source of the uplink transmission. The different resources may include one or more of time resources, frequency resources, beam resources, spatial layer resources, and/or a scrambling sequence. Thus, different sets of resources may be assigned for uplink transmissions originating from different UEs. For example, a first set of resources may be allocated for transmissions for which the first UE is the originating source of the uplink transmission, a second set of resources may be allocated for transmissions for which the second UE is the originating source of the uplink transmission, etc. In some examples, a set of resources may include any suitable quantity and/or division of available resources.

In some examples in which the first UE uses different resources when transmitting the uplink transmission, the base station may determine the originating source of the uplink transmission based on the resource(s) associated with the received uplink transmission. The different resources may include any combination of time, frequency, beam, spatial layer, or scrambling sequence. In FIG. 4, an example is illustrated showing sets of resources, e.g., in resource set 424, that are allocated for transmissions originating from different UEs. The resource set 424 in this example may correspond to resources in time and frequency. For example, the base station may identify a resource(s) used for the transmission of the uplink transmission and then map the identified resource(s) to a corresponding UE (e.g., the first UE, the second UE, etc.).

In some examples, first UE may scramble the uplink transmission with an identifier associated with the originating source. The base station may then determine the originating source of the uplink transmission based on the identifier after decoding the received uplink transmission. For example, the first UE may use a sequence to scramble at least a portion of the uplink transmission, and the set of resources allocated for transmissions for which a particular UE is the originating source of the uplink transmission include scrambling a cyclic redundancy check (CRC) portion with an identifier associated with the particular UE.

In some examples, one or more techniques may be used for allocating the sets of resources to the respective UEs. In some examples, the different sets of resources are allocated based on predefined rule(s). For example, the predefined rule may be based on a temporal relationship with a downlink transmission. For example, ACK/NACK feedback may be expected N slots after a downlink transmission. In some such examples, the base station may map ACK/NACK feedback received N slots after a downlink transmission to the UE associated with the downlink transmission. In some examples, the different sets of resources are allocated based on signaling provided by the base station. For example, during setup of communications with the first UE, the base station may provide to the first UE, via one or more of downlink control information (DCI) signaling, radio resource control (RRC) signaling, and/or medium access control-control element (MAC-CE) signaling, the different resource allocations to be used for transmissions for which the respective UE is the originating source. In some examples, the different sets of resources are allocated based on signaling provided by the first UE. For example, the signaling provided by the first UE may include a UE indication and/or a UE report. For example, the first UE may signal to the base station that a first set of resources is allocated for transmissions for which the first UE is the originating source, a second set of resources is allocated for transmissions for which the second UE is the originating source, etc.

In some examples, the first UE may receive an uplink transmission from the second UE, which may then trigger a series of transmissions between the first UE and the base station. In some examples, the series of transmissions may include the first UE transmitting a scheduling request (SR) using a dedicated resource to the base station, the base station transmitting an order to the first UE to transmit the uplink transmission based on the SR, and the first UE transmitting the uplink transmission to the base station based on the received order to transmit. In some examples, the SR may indicate the source of the uplink transmission. As used herein, a dedicated resource is a resource (e.g., a time resource, a frequency resource, a beam resource, a spatial layer resources, and/or a scrambling sequence) that is scheduled for a particular uplink transmission. The first UE may then transmit the uplink transmission in accordance with the order to transmit (and/or the SR).

For example, the second UE may determine that a downlink beam between the second UE and the base station is failing. The second UE may then transmit a beam frequency recovery request (BFRQ) and/or a beam failure report (BFR) to the first UE based on the failing downlink beam. In some such example, in response to receiving the uplink transmission (e.g., the BFRQ and/or the BFR), the first UE may transmit an SR to the base station using a dedicated resource to trigger the transmission of the uplink transmission to the base station. The SR may include an indicator that the second UE is the originating source of the BFRQ and/or the BFR that triggered the SR. The base station may receive the SR and transmit, via PDCCH, an order to transmit the uplink transmission (e.g., the BFRQ and/or the BFR). The first UE may then relay the uplink transmission received from the second UE (e.g., the BFRQ and/or the BFR) to the base station. In some examples, the BFRQ is triggered when the second UE determines that a downlink beam between the second UE and the base station is failing. In some examples, the BFR may include at least one of a failed component carrier index identifying the failing downlink beam and a new candidate beam index to replace the failing downlink beam.

In some examples, the first UE may provide an indication to the base station of the originating source of the uplink transmission by (a) adding a label to the uplink transmission, (b) transmitting the uplink transmission using a set of resources allocated for transmissions for which the respective UE is the originating source, and/or (c) transmitting a scheduling request (SR) to the base station using a dedicated resource in response to the receiving of the uplink transmission from the respective UE. In some examples, the first UE may determine which technique to use for providing the indication based on one or more characteristics (e.g., a channel type, a payload size, a scheduling type, and/or a type of transmission) associated with the uplink transmission. For example, the first UE may add a label to the uplink transmission when the uplink transmission corresponds to PUSCH, when the payload size of the uplink transmission does not satisfy a size threshold (e.g., is greater than or equal to the size threshold), and/or when then scheduling type corresponds to a grant-free uplink transmission. The first UE may transmit the uplink transmission using a set of resources allocated for transmissions for which the respective UE (e.g., the second UE) is the originating source when the uplink transmission corresponds to PUCCH, when the payload size of the uplink transmission satisfies the size threshold (e.g., is less than the size threshold), and/or when the scheduling type corresponds to a grant-based uplink transmission. In some examples, the grant-based uplink transmission may be scheduled via downlink signaling (e.g., via DCI, via RRC, and/or via MAC-CE), and the set of resources for the uplink transmission may be indicated in the downlink signaling. In some examples, the first UE may transmit the SR to the base station using a dedicated resource based on the type of transmission associated with the uplink transmission. For example, the first UE may transmit the SR when the uplink transmission is a BFRQ and/or a BFR.

FIG. 4 is a diagram illustrating a call flow diagram 400 between a base station 402, a first UE 404, and a second UE 406 implementing aspects of relaying uplink transmissions, as disclosed herein. The base station 402 may correspond to the base stations 102/180 of FIG. 1 and/or the base station 310 of FIG. 3. The UEs 404, 406 may correspond to the UE 104 of FIG. 1 and/or the UE 350 of FIG. 3. In the illustrated example of FIG. 4, the first UE 404 is a relay UE that may relay uplink transmissions from the second UE 406 to the base station 402.

As illustrated at 410, the second UE 406 may receive a downlink transmission 410 from the base station 402. At 411, the second UE 406 transmits an uplink transmission 412 to the first UE 404. The uplink transmission 412 may be a data transmission, a control transmission, and/or a reference signal transmission. In some examples, the uplink transmission 412 may be PUSCH or may be PUCCH. In some examples, the uplink transmission 412 is a grant-free uplink transmission. In some examples, the uplink transmission 412 is a grant-based uplink transmission. In some such examples, the grant-based uplink transmission may be scheduled via the downlink transmission 410. In some examples, the uplink transmission 412 may be an SR triggering uplink transmission, such as a BFRQ and/or a BFR.

At 414, the first UE 404 determines a technique for providing an indication of the originating source of the uplink transmission 412 to the base station 402. For example, the first UE 404 may provide an indication to the base station 402 of the originating source of the uplink transmission 412 by (a) adding a label to the uplink transmission 412, (b) transmitting the uplink transmission 412 using a set of resources allocated for transmissions for which the second UE 406 is the originating source, and/or (c) transmitting a scheduling request (SR) to the base station 402 using a dedicated resource in response to the receiving of the uplink transmission 412 from the second UE 406. In some examples, the first UE 404 may determine the technique for providing the indication based on one or more characteristics (e.g., a channel type, a payload size, a scheduling type, and/or a type of transmission) associated with the uplink transmission 412.

At 416, the first UE 404 relays the uplink transmission 412 to the base station 402 and provides an indication that the second UE 406 is the originating source of the uplink transmission 412. After receiving the uplink transmission 412 from the first UE 404, at 418, the base station 402 determines the originating source of the uplink transmission 412.

In some examples in which the first UE 404 adds a label to the uplink transmission 412, the base station 402 may determine the originating source of the received uplink transmission 412 based on the additional signaling provided in the uplink transmission 412. For example, the base station 402 may determine the originating source of the received uplink transmission 412 based on information added to the header of the uplink transmission 412, appended to the uplink transmission 412, and/or received in a signal separate from the uplink transmission 412. In some examples, the base station 402 may determine the originating source of the received uplink transmission 412 based on the presence or absence of the additional signaling. Transmission 420 illustrates an example of an uplink transmission for which the first UE 404 has added a wrapper to the uplink transmission. Transmission 422 illustrates an example of an uplink transmission for which the first UE 404 has added information including an originating source identifier.

In some examples, the first UE 404 may use different resources when transmitting the uplink transmission 412 to distinguish the originating source of the uplink transmission 412. The different resources may include one or more of time resources, frequency resources, beam resources, spatial layer resources, and/or a scrambling sequence. Thus, different sets of resources may be assigned for uplink transmissions originating from different UEs. As one example, a first set of resources 424a allocated for transmissions for which the first UE 404 is the originating source of the uplink transmission 412 and a second set of resources 424b allocated for transmissions for which the second UE 406 is the originating source of the uplink transmission 412 are illustrated as resources 424. The resources 424 illustrated in FIG. 4 may correspond to resources in time and frequency, for example. In some examples, the allocation of the resources may be based on predefined rules, base station signaling, and/or signaling provided by the first UE 404.

In some examples in which the first UE 404 uses different resources when transmitting the uplink transmission 412, the base station 402 may determine the originating source of the uplink transmission 412 based on the resource(s) associated with the received uplink transmission 412. For example, the base station 402 may identify a resource(s) used for the transmission of the uplink transmission 412 and then map the identified resource(s) to a corresponding UE (e.g., the first UE, the second UE, etc.).

Figure 5:
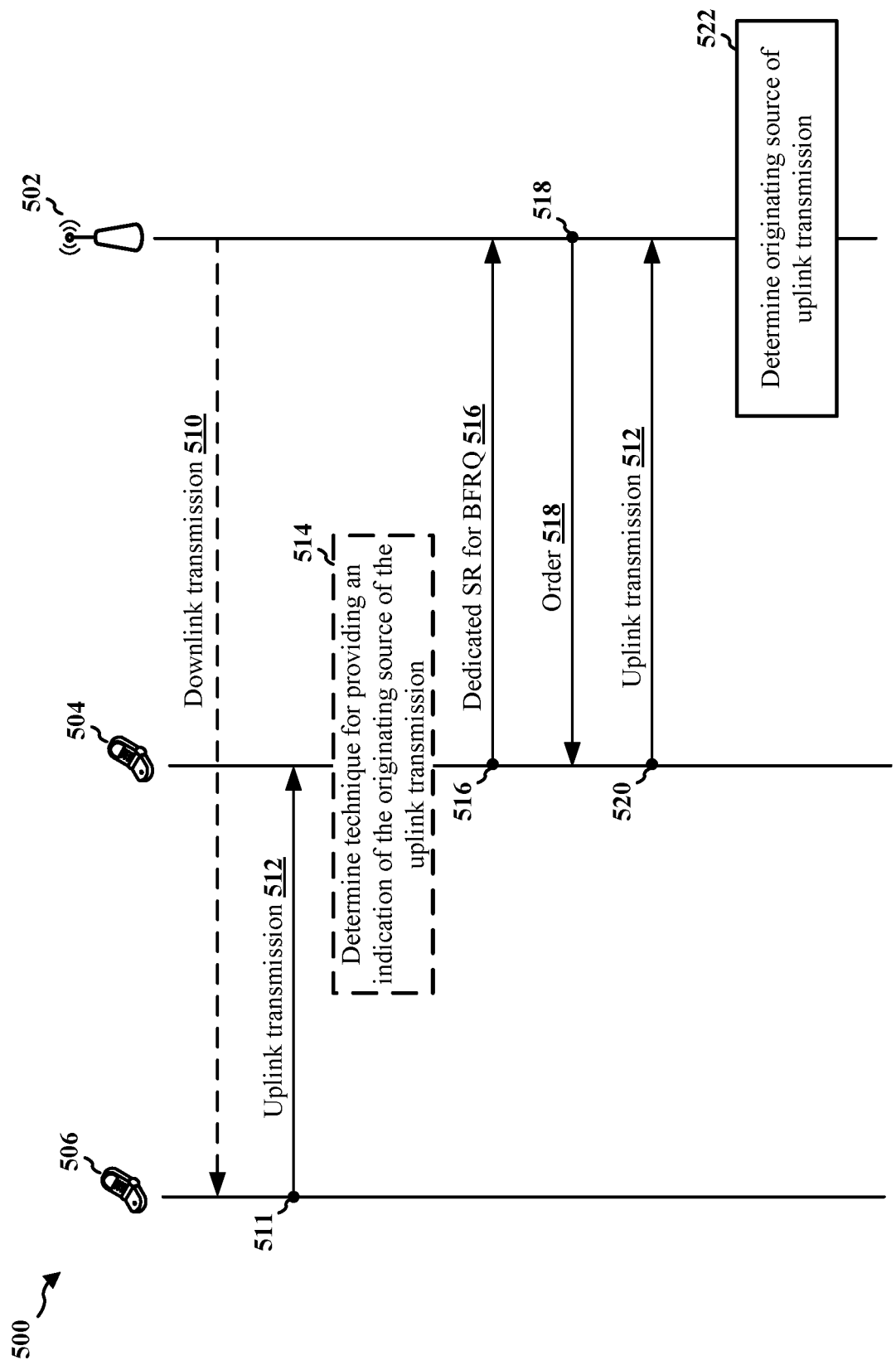
FIG. 5 is a diagram illustrating another call flow diagram between a first UE, a second UE, and a base station.

FIG. 5 is a diagram illustrating a call flow diagram 500 between a base station 502, a first UE 504, and a second UE 506 implementing aspects of relaying uplink transmissions, as disclosed herein. The base station 502 may correspond to the base stations 102/180 of FIG. 1, the base station 310 of FIG. 3, and/or the base station 402 of FIG. 4. The UEs 504, 506 may correspond to the UE 104 of FIG. 1, the UE 350 of FIG. 3, and/or the UEs 404, 406 of FIG. 4. In the illustrated example of FIG. 5, the first UE 504 is a relay UE that may relay uplink transmissions from the second UE 506 to the base station 502.

As illustrated at 510, the second UE 506 may receive a downlink transmission 510 from the base station 502. At 511, the second UE 506 transmits an uplink transmission 512 to the first UE 504. The uplink transmission 512 may be a data transmission, a control transmission, and/or a reference signal transmission. In the illustrated example of FIG. 5, the uplink transmission 512 is a BFRQ transmitted by the second UE 506 in response to determining a failing downlink beam between the base station 502 and the second UE 506.

At 514, the first UE 504 determines a technique for providing an indication of the originating source of the uplink transmission 512 to the base station 502. For example, the first UE 504 may provide an indication to the base station 502 of the originating source of the uplink transmission 512 by (a) adding a label to the uplink transmission 512, (b) transmitting the uplink transmission 512 using a set of resources allocated for transmissions for which the second UE 506 is the originating source, and/or (c) transmitting a scheduling request (SR) to the base station 502 using a dedicated resource in response to the receiving of the uplink transmission 512 from the second UE 506. In some examples, the first UE 504 may determine the technique for providing the indication based on one or more characteristics (e.g., a channel type, a payload size, a scheduling type, and/or a type of transmission) associated with the uplink transmission 512.

In the illustrated example of FIG. 5, the first UE 504 determines that the type of transmission associated with the uplink transmission 512 is a BFRQ, which requires an SR to trigger the transmission of the uplink transmission 512. At 516, the first UE 504 transmits a dedicated SR 516 for the BFRQ. The dedicated SR 516 is transmitted using a dedicated resource. In some examples, the first UE 504 may provide an indication that the second UE 506 is the originating source of the BFRQ (e.g., uplink transmission 512). At 518, the base station 502 transmits an order 518 to the first UE 504 to transmit the BFRQ (e.g., uplink transmission 512). The base station 502 may transmit the order 518 via PDCCH to transmit the BFRQ (e.g., uplink transmission 512) via PUCCH and/or PUSCH.

At 520, the first UE 504 relays the uplink transmission 512 (e.g., the BFRQ) to the base station 502 and provides an indication that the second UE 506 is the originating source of the uplink transmission 512. In the illustrated example, the uplink transmission 512 is sent for the same originating source as the source identified in the dedicated SR 516. After receiving the uplink transmission 512 from the first UE 504, at 522, the base station 502 determines the originating source of the uplink transmission 512 (e.g., the second UE 506).

Figure 6:
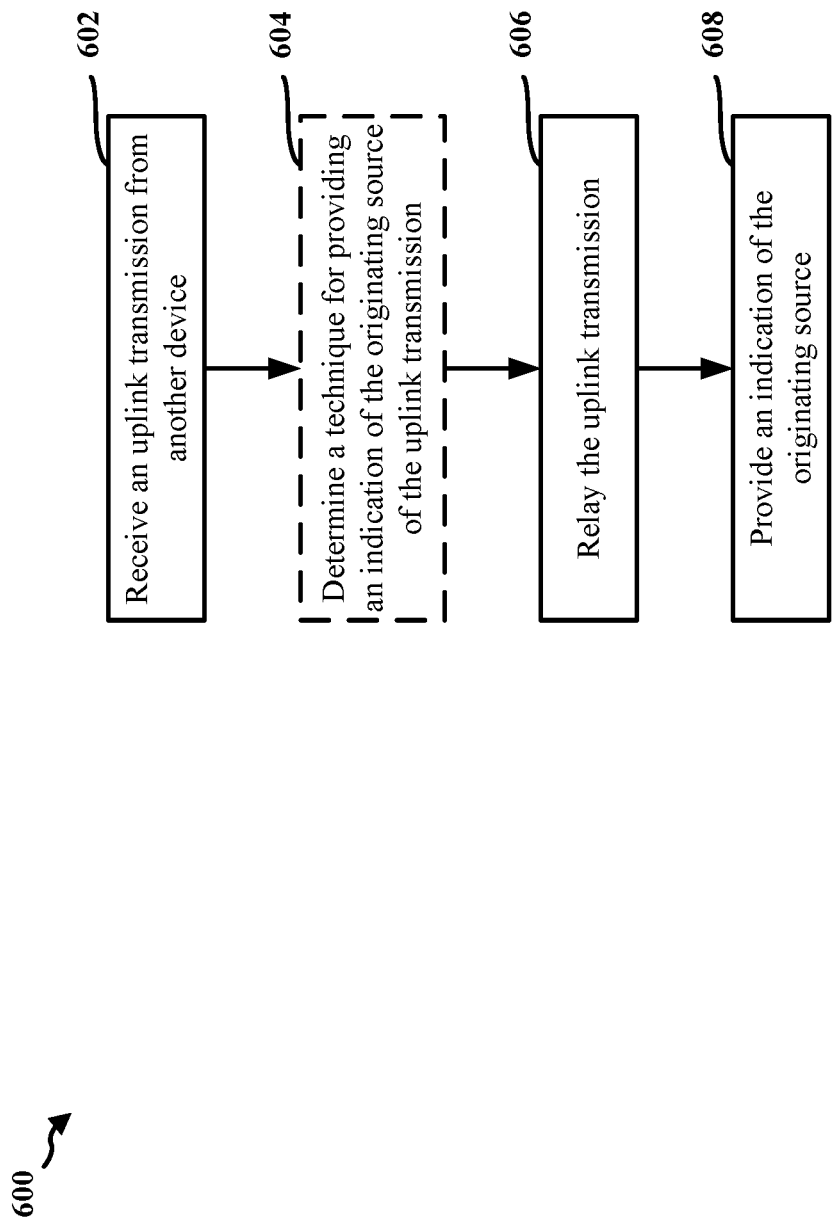
FIGS. 6 to 10 are flowcharts of example methods of wireless communication at a device.

FIG. 6 is a flowchart 600 of a method of wireless communication. The method may be performed by a device, such as a UE (e.g., the UE 104, the UE 350, the UE 404, the UE 406, the UE 504, the UE 506, the UE 1450; the apparatus 1102/1102'; the processing system 1214, which may include the memory 360 and which may be the entire UE 350 or a component of the UE 350, such as the TX processor 368, the RX processor 356, and/or the controller/processor 359). In the illustrated example, the device is a relay device, such as a relay UE, a relay node, or an IAB node. The method may improve relayed uplink transmissions by distinguishing originating sources for received transmissions at a base station. Optional aspects are illustrated with a dashed line.

At 602, the relay device receives an uplink transmission from another device. For example, a reception component 1104 of apparatus 1102 of FIG. 11 may be configured to receive the uplink transmission from the other device. The uplink transmission may be a data transmission, a control transmission, and/or a reference signal transmission.

At 604, the relay device may determine a technique for providing an indication of the originating source of the uplink transmission. For example, an indication providing component 1106 of the apparatus 1102 may be configured to determine the technique for providing the indication. The relay device may determine the technique for providing the indication based on, for example, one or more of a transmission type associated with the uplink transmission, a channel associated with the uplink transmission, a payload size associated with the uplink transmission and/or a scheduling type associated with the uplink transmission.

At 606, the relay device relays the uplink transmission to the base station. For example, a transmission component 1114 of the apparatus 1102 may be configured to relay the uplink transmission to the base station. In some examples, relaying the uplink transmission may include the relay device transmitting the content of the received uplink transmission to the base station. The uplink transmission may comprise an uplink control transmission and/or an uplink data transmission.

At 608, the relay device provides an indication of the originating source to the base station. For example, the indication providing component 1106 of the apparatus 1102 may be configured to provide the indication of the originating source to the base station. In some examples, the relay device may provide the indication via at least one of (a) adding a label to the uplink transmission, (b) transmitting the uplink transmission using a set of resources allocated for transmissions for which the second device is the originating source, or (c) transmitting an SR to the base station using a dedicated resource in response to the receiving of the uplink transmission from the second device.

FIGS. 7 to 10 are flowcharts of example methods of wireless communications. The methods of FIGS. 7 to 10 may be performed by a device, such as a UE (e.g., the UE 104, the UE 350, the UE 404, the UE 406, the UE 504, the UE 506, the UE 1450; the apparatus 1102/1102'; the processing system 1214, which may include the memory 360 and which may be the entire UE 350 or a component of the UE 350, such as the TX processor 368, the RX processor 356, and/or the controller/processor 359). In the illustrated examples of FIGS. 7 to 10, the device is a relay device, such as a relay UE, a relay node, or an IAB node. The methods may improve relayed uplink transmissions by distinguishing originating sources for received transmissions at a base station. In the illustrated examples, the methods of FIGS. 7 to 10 are example implementations for determining the technique for providing an indication of the originating source of the uplink transmission (e.g., 604 of FIG. 6) and/or the indicating providing component 1106 of the apparatus 1102 of FIG. 11.

Figure 7:
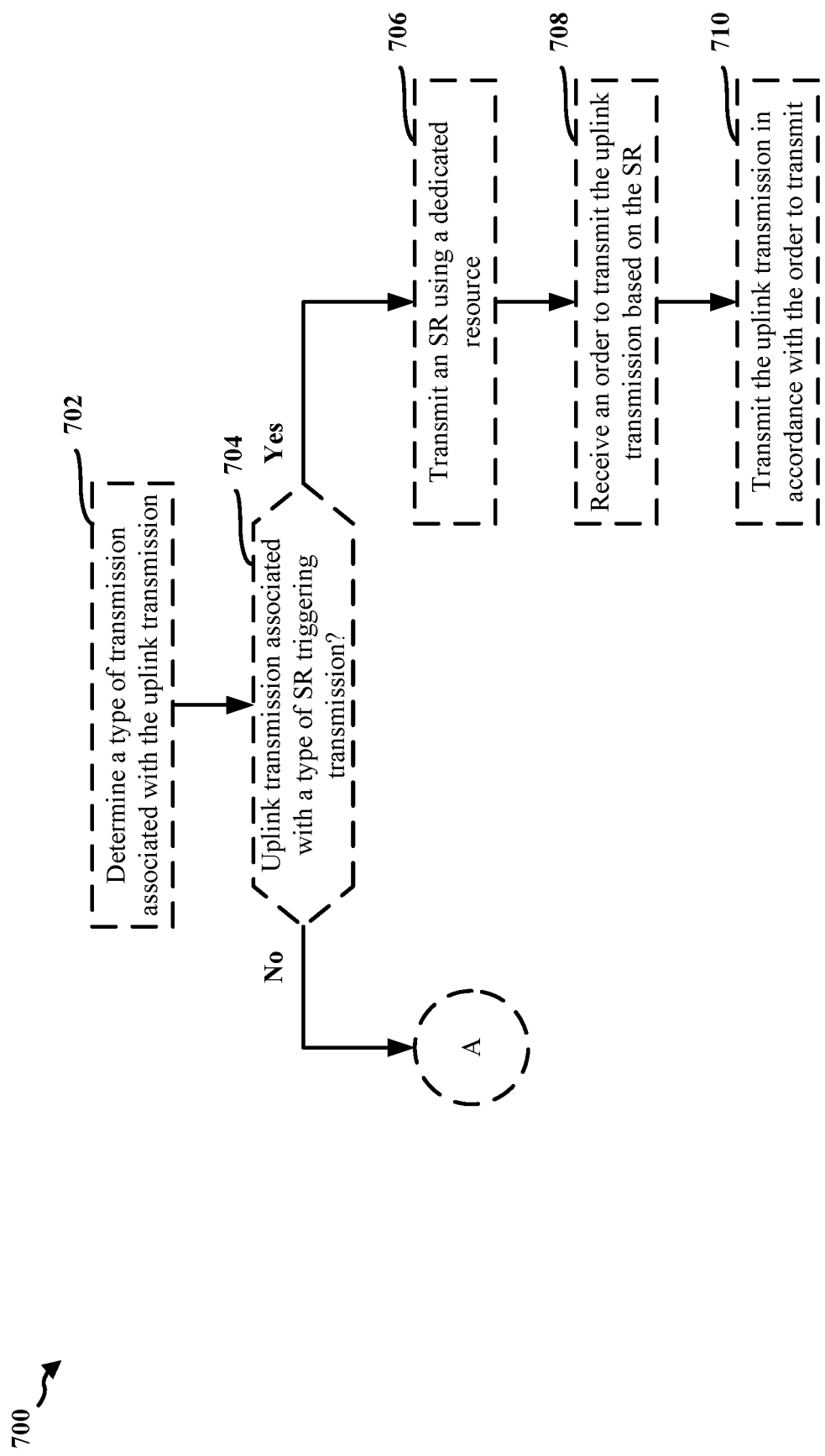

FIG. 7 is a flowchart 700 of a method of wireless communication based on a transmission type associated with the uplink transmission. At 702, the relay device may determine a type of transmission associated with the uplink transmission. For example, a transmission type component 1108 of the apparatus 1102 may be configured to determine the type of transmission associated with the uplink transmission. For example, the relay device may determine whether the uplink transmission is associated with an SR triggering transmission. In some examples, an SR triggering transmission may include a BFRQ, a BFR, and/or an SR. However, in other examples, the uplink transmission may be associated with additional or alternative types of SR triggering transmissions (such as, for example, based on Standards).

At 704, the relay device may determine whether the uplink transmission is associated with a type of SR triggering transmission. For example, the transmission type component 1108 of the apparatus 1102 may be configured to determine whether the transmission type of the uplink transmission triggers an SR.

If, at 704, the relay device determines that the uplink transmission is associated with a type of SR triggering transmission, then, at 706, the relay device may transmit an SR using a dedicated resource to a base station. For example, an SR component 1110 of the apparatus 1102 may be configured to transmit the SR using the dedicated resource to the base station. In some examples, the dedicated resource used for transmitting the SR may indicate the originating source of the uplink transmission.

At 708, the relay device may receive an order to transmit the uplink transmission from the base station based on the SR. For example, a transmit order component 1112 of the apparatus 1102 may be configured to receive the order to transmit the uplink transmission based on the SR. In some examples, the order to transmit may be received via the PDCCH.

At 710, the relay device may transmit the uplink transmission in accordance with the order to transmit. For example, a transmission component 1114 of the apparatus 1102 may be configured to transmit the uplink transmission in accordance with the order to transmit.

Figure 8:
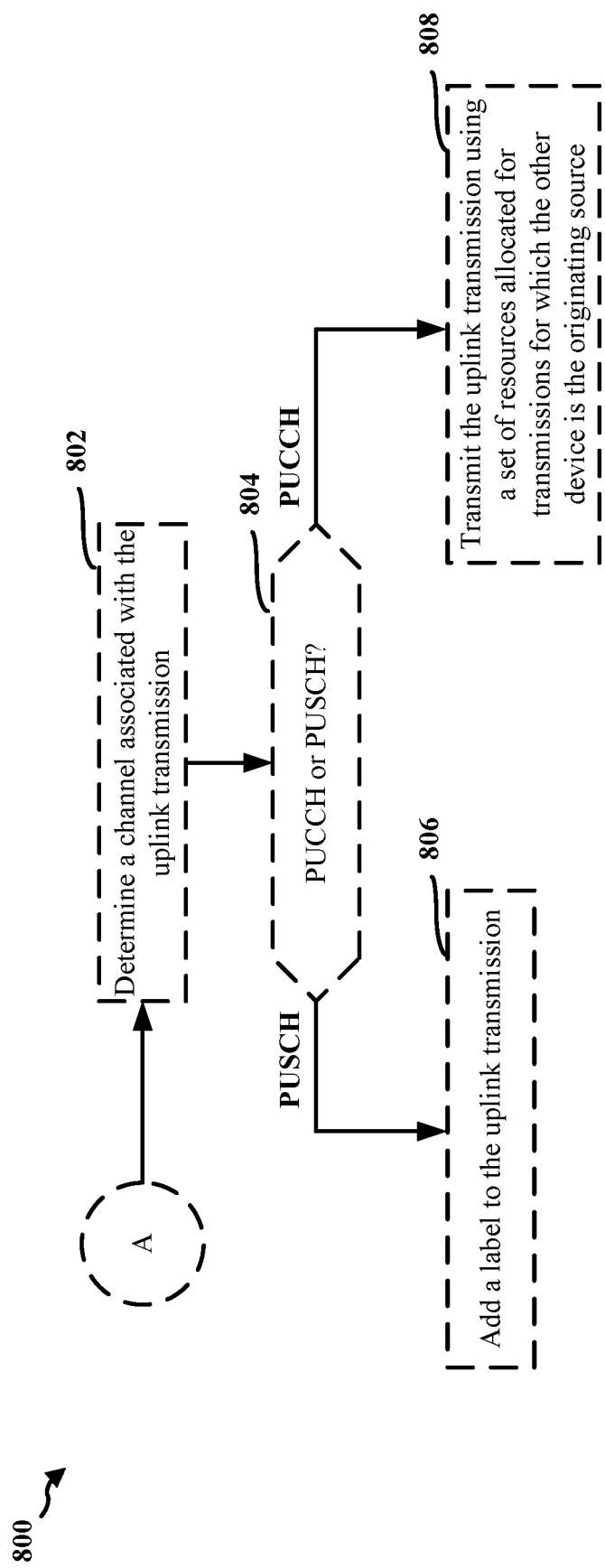

If, at 704, the relay device determines that uplink transmission is not associated with a type of SR triggering transmission, then control proceeds to 802 of FIG. 8.

FIG. 8 is a flowchart 800 of a method of wireless communication based on a channel associated with the uplink transmission. In some examples, the PUCCH may be shorter than adding a label, so it may not be beneficial to add a label to distinguish the originating source of the uplink transmission. In some such examples, the relay device may distinguish the originating source based on a set of resources.

At 802, the relay device may determine a channel associated with the uplink transmission. For example, a channel component 1116 of the apparatus 1102 may be configured to determine the channel associated with the uplink transmission. In some examples, the relay device may perform the determining of the channel after receiving the uplink transmission. In some examples, the relay device may perform the determining of the channel after determining that the transmission type of the uplink transmission does not trigger an SR (e.g., at 704 of flowchart 700).

At 804, the relay device may determine whether the channel associated with the uplink transmission is PUCCH or PUSCH. For example, the channel component 1116 of the apparatus 1102 may be configured to determine whether the channel associated with the uplink transmission is PUCCH or PUSCH.

If, at 804, the relay device determines that the channel associated with the uplink transmission is PUSCH, then, at 806, the relay device may add a label to the uplink transmission. For example, a label adding component 1118 of the apparatus 1102 may be configured to add the label to the uplink transmission. The label may identify the originating source of the uplink transmission. In some examples, the label may be comprised in at least one of a header of the uplink transmission or information appended to the uplink transmission. In some examples, the label may be provided in a signal separate from the uplink transmission.

If, at 804, the relay device determines that the channel associated with the uplink transmission is PUCCH, then, at 808, the relay device may transmit the uplink transmission using a set of resources allocated for transmissions originating from respective devices. For example, a resources component 1120 of the apparatus 1102 may be configured to determine the set of resources to use for transmitting the uplink transmission. The set of resources may include at least one of time resources, frequency resources, beam resources, spatial layer resources, and/or a scrambling sequence. In some examples, different sets of resources may be allocated to different respective devices. In some examples, a set of resources may include scrambling a CRC portion of a predefined code block (e.g., of a transport block) in the uplink transmission with an identifier associated with the device that is the originating source.

In some examples, the sets of resources may be allocated based on predefined rules. For example, in some examples, the predefined rule may be based on a temporal relation with a downlink transmission. In some examples, the sets of resources may be allocated based on signaling provided by the base station. For example, the signaling provided by the base station may include at least one of DCI signaling, RRC signaling, and/or MAC-CE signaling. In some examples, the sets of resources may be allocated based on signaling provided by the relay device. For example, the signaling provided by the relay device may include a device indication and/or a device report.

Figure 9:
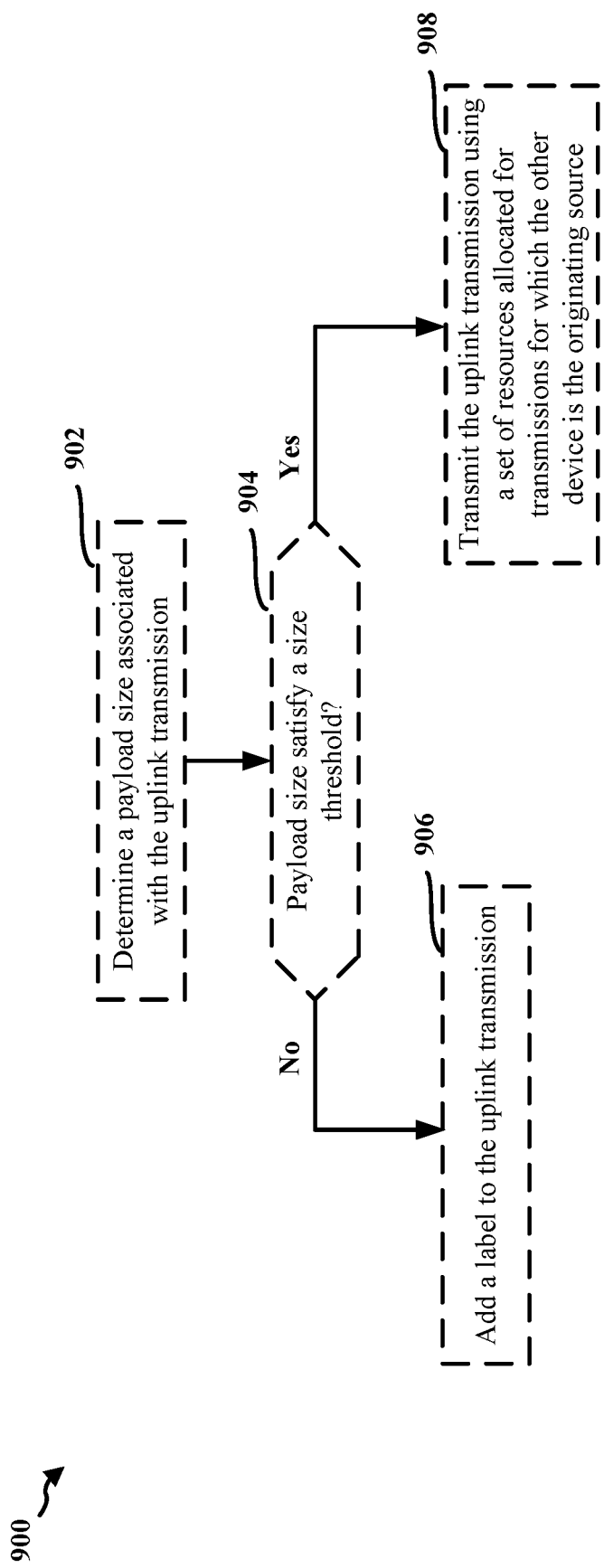

FIG. 9 is a flowchart 900 of a method of wireless communication based on a payload size associated with the uplink transmission. In some examples, if the payload size is less than a size threshold, it may not be beneficial to add a label for distinguishing the originating source of the uplink transmission. In some such examples, the relay device may distinguish the originating source based on a set of resources.

At 902, the relay device may determine a payload size associated with the uplink transmission. For example, a payload size component 1122 of the apparatus 1102 may be configured to determine the size of the payload associated with the uplink transmission.

At 904, the relay device may determine whether the payload size associated with the uplink transmission satisfies a size threshold. For example, the payload size component 1112 of the apparatus 1102 may be configured to determine whether the payload size associated with the uplink transmission satisfies the size threshold. In some examples, the relay device may compare the payload size to the size threshold and determine whether the payload size is less than the size threshold or greater than the size threshold.

If, at 904, the relay device determines that the payload size does not satisfy the size threshold (e.g., the payload size is equal to or greater than the size threshold), then, at 906, the relay device may add a label to the uplink transmission. For example, the label adding component 1118 of the apparatus 1102 may be configured to add a label to the uplink transmission. The label may identify the originating source of the uplink transmission. In some examples, the label may be comprised in at least one of a header of the uplink transmission or information appended to the uplink transmission. In some examples, the label may be provided in a signal separate from the uplink transmission.

If, at 904, the relay device determines that the payload size satisfies the size threshold (e.g., the payload size is less than the size threshold), then, at 908, the relay device may determine to transmit the uplink transmission using a set of resources allocated for transmissions originating from respective devices. For example, the resources component 1120 of the apparatus 1102 may be configured to determine the set of resources to use for transmitting the uplink transmission. The set of resources may include at least one of time resources, frequency resources, beam resources, spatial layer resources, and/or a scrambling sequence. In some examples, different sets of resources may be allocated to different respective devices. In some examples, a set of resources may include scrambling a CRC portion with an identifier associated with the device that is the originating source.

In some examples, the sets of resources may be allocated based on predefined rules. For example, in some examples, the predefined rule may be based on a temporal relation with a downlink transmission. In some examples, the sets of resources may be allocated based on signaling provided by the base station. For example, the signaling provided by the base station may include at least one of DCI signaling, RRC signaling, and/or MAC-CE signaling. In some examples, the sets of resources may be allocated based on signaling provided by the relay device. For example, the signaling provided by the relay device may include a device indication and/or a device report.

Figure 10:
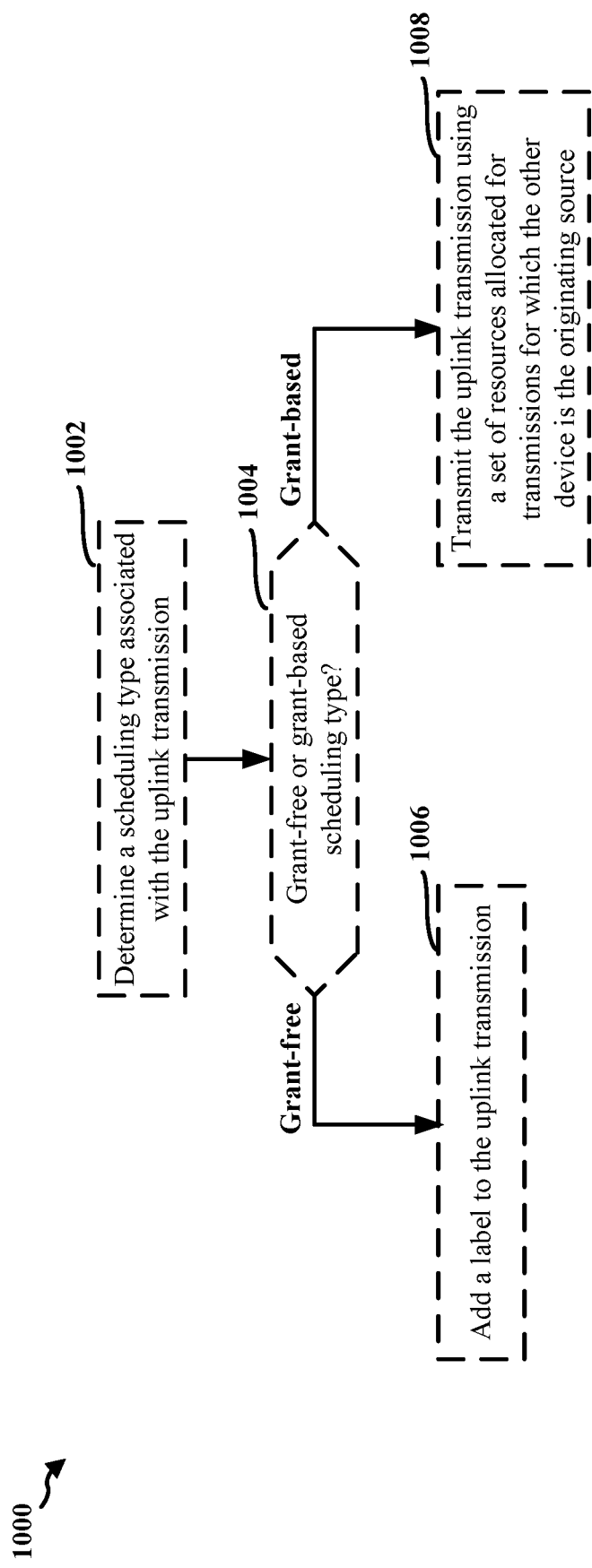

FIG. 10 is a flowchart 1000 of a method of wireless communication based on a scheduling type associated with the uplink transmission. In some examples, if the scheduling type is grant-based, then it may not be beneficial to add a label for distinguishing the originating source of the uplink transmission since a resource allocation can be indicated via DCI signaling. In some such examples, the relay device may distinguish the originating source based on a set of resources.

At 1002, the relay device may determine a scheduling type associated with the uplink transmission. For example, a scheduling type component 1124 of the apparatus 1102 may be configured to determine the scheduling type associated with the uplink transmission.

At 1004, the relay device may determine whether the scheduling type associated with the uplink transmission is grant-free or grant-based. For example, the scheduling type component 1124 of the apparatus 1102 may be configured to determine whether the scheduling type associated with the uplink transmission is grant-free or grant-based.

If, at 1004, the relay device determines that the scheduling type is a grant-free uplink transmission, then, at 1006, the relay device may add a label to the uplink transmission. For example, the label adding component 1118 of the apparatus 1102 may be configured to add a label to the uplink transmission. The label may identify the originating source of the uplink transmission. In some examples, the label may be comprised in at least one of a header of the uplink transmission or information appended to the uplink transmission. In some examples, the label may be provided in a signal separate from the uplink transmission.

If, at 1004, the relay device determines that the scheduling type is a grant-based uplink transmission, then, at 1008, the relay device may determine to transmit the uplink transmission using a set of resources allocated for transmissions originating from respective devices. For example, the resources component 1120 of the apparatus 1102 may be configured to determine the set of resources to use for transmitting the uplink transmission. The set of resources may include at least one of time resources, frequency resources, beam resources, spatial layer resources, and/or a scrambling sequence. In some examples, different sets of resources may be allocated to different respective devices. In some examples, a set of resources may include scrambling a CRC portion with an identifier associated with the device that is the originating source.

In some examples, the sets of resources may be allocated based on predefined rules. For example, in some examples, the predefined rule may be based on a temporal relation with a downlink transmission. In some examples, the sets of resources may be allocated based on signaling provided by the base station. For example, the signaling provided by the base station may include at least one of DCI signaling, RRC signaling, and/or MAC-CE signaling. In some examples, the sets of resources may be allocated based on signaling provided by the relay device. For example, the signaling provided by the relay device may include a device indication and/or a device report.

Although the above flowcharts 700 to 1000 of FIGS. 7 to 10, respectively, illustrate that the relay device may initiate the flowchart 800 of FIG. 8 after determining that the transmission type of the uplink transmission did not trigger an SR (e.g., at 802 of flowchart 800 after 704 of flowchart 700), in other examples, the relay device may initiate the flowcharts 900 and/or 1000 after the determination regarding the transmission type of the uplink transmission. Furthermore, in some examples, the order of the flowcharts 700 to 1000 may vary. For example, when determining the technique for providing the indication of the originating source of the uplink transmission, the relay device may perform the flowchart 700 and then the flowchart 800, may perform the flowchart 700 and then the flowchart 900, or may perform the flowchart 700 and then the flowchart 1000. Additionally or alternatively, in some examples, the relay device may perform the flowcharts 800 to 1000 at the same time (or nearly at the same time) to determine the technique for providing the indication of the originating source of the uplink transmission.

Figure 11:
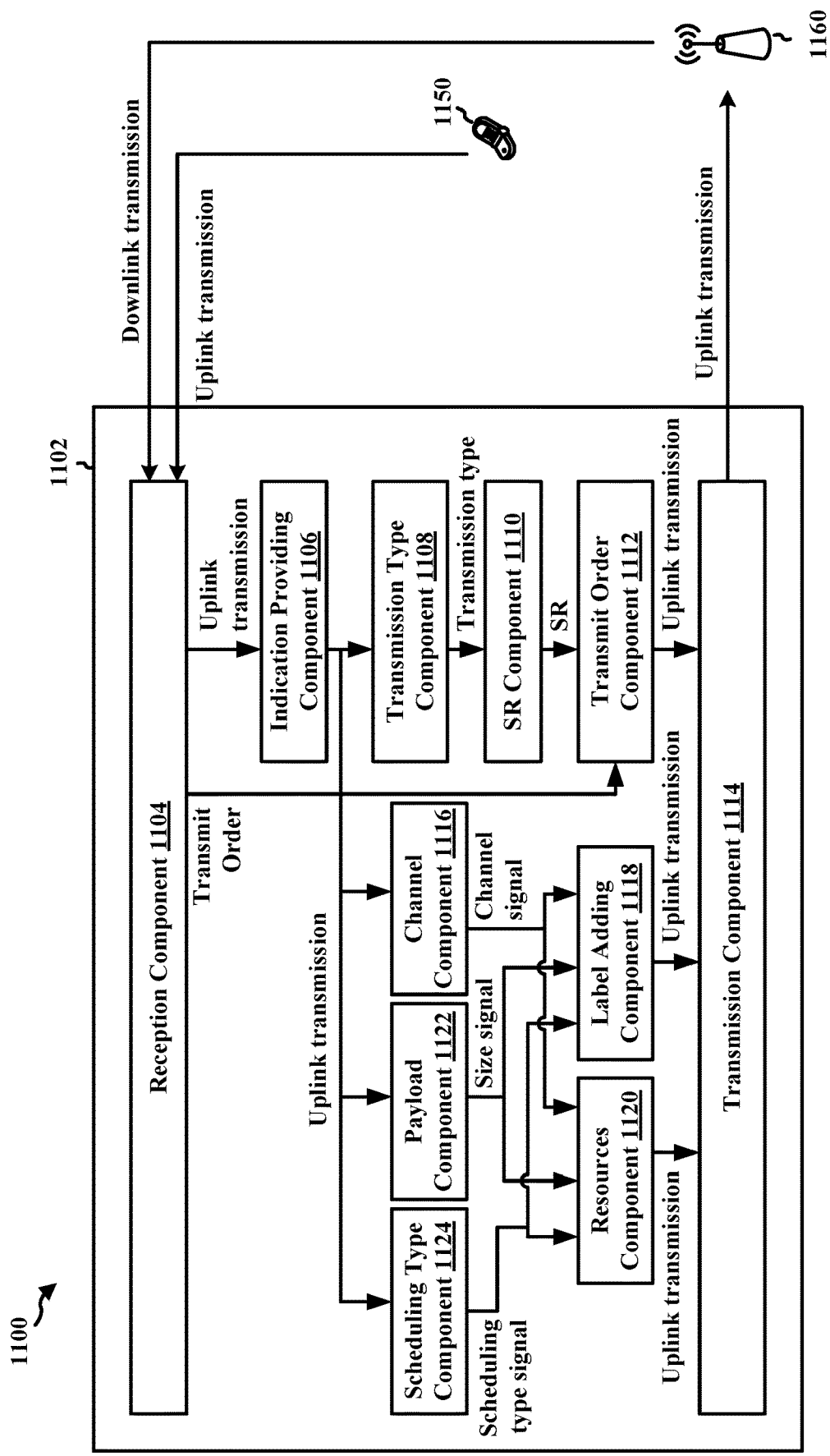
FIG. 11 is a conceptual data flow diagram illustrating the data flow between different means/components in an example apparatus.

FIG. 11 is a conceptual data flow diagram 1100 illustrating the data flow between different means/components in an example apparatus 1102 in communication with a UE 1150 and a base station 1160. The apparatus may be a device, such as a UE or a component of a UE. The apparatus may perform the methods of flowcharts 600, 700, 800, 900, and/or 1000. The apparatus includes a reception component 1104, an indication providing component 1106, a transmission type component 1108, an SR component 1110, a transmit order component 1112, a transmission component 1114, a channel component 1116, a label adding component 1118, a resources component 1120, a payload component 1122, and a scheduling type component 1124. The UE 1150 may include the same or similar components as shown with respect to the apparatus 1102. The base station 1160 may include the same or similar components as shown with respect to the apparatus 1402 and discussed below in connection with FIGS. 14 and/or 15.

The reception component 1104 may be configured to receive various types of signals/messages and/or other information from other devices including the UE 1150 and/or the base station 1160. The messages/information may be received via the reception component 1104 and provided to one or more components of the apparatus 1102 for further processing and use in performing various operations (e.g., as described in connection with 602 and/or 708).

The indication providing component 1106 may be configured to determine a technique for providing an indication of the originating source of the uplink transmission and/or provide an indication of the originating source (e.g., as described in connection with 604 and/or 608).

The transmission type component 1108 may be configured to determine a type of transmission associated with the uplink transmission and/or determine whether the type of transmission associated with the uplink transmission is to trigger an SR using a dedicated resource (e.g., as described in connection with 702 and/or 704).

The SR component 1110 may be configured to cause the transmitting of an SR (e.g., to the base station 1160) using a dedicated resource (e.g., as described in connection with 706).

The transmit order component 1112 may be configured to receive (e.g., from the base station 1160) an order to transmit the uplink transmission in accordance with the SR (e.g., as described in connection with 708).

The transmission component 1114 may be configured to transmit signals to one or more external devices including, for example, the base station 1160, in accordance with the aspects described herein. In various configurations, the signals and/or information may be transmitted by the transmission component 1114 in accordance with the methods discussed supra including the methods of flowcharts of FIGS. 6 to 10 (e.g., as described in connection with 606 and/or 710).

The channel component 1116 may be configured to determine a channel associated with the uplink transmission and/or whether the channel associated with the uplink transmission is PUCCH or PUSCH (e.g., as described in connection with 802 and/or 804).

The label adding component 1118 may be configured to add a label, additional signaling, and/or information to the uplink transmission identifying the originating source of the uplink transmission (e.g., as described in connection with 806, 906, and/or 1006).

The resources component 1120 may be configured to cause the transmitting of the uplink transmission using a set of resources allocated for the transmission for which the respective device is the originating source of the uplink transmission (e.g., as described in connection with 808, 908, and/or 1008).

The payload component 1122 may be configured to determine a payload size associated with the uplink transmission and/or whether the payload size satisfies a size threshold (e.g., as described in connection with 902 and/or 904).

The scheduling type component 1124 may be configured to determine a type of schedule associated with the uplink transmission and/or whether the uplink transmission is a granted-based uplink transmission or a grant-free uplink transmission (e.g., as described in connection with 1002 and/or 1004).

The apparatus may include additional components that perform each of the blocks of the algorithm in the aforementioned flowcharts of FIGS. 6 to 10. As such, each block in the aforementioned flowcharts of FIGS. 6 to 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
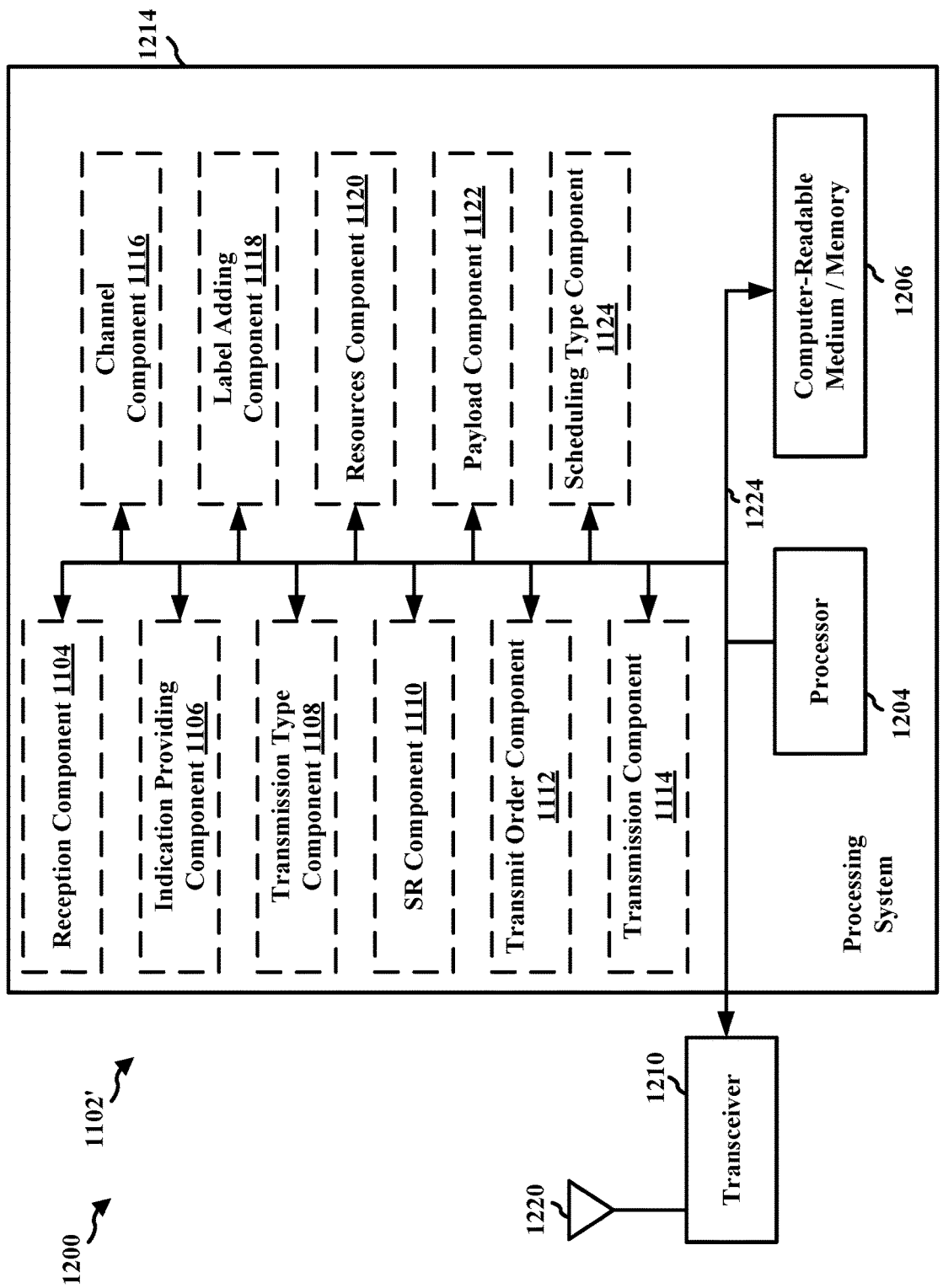
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1114, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see the UE 350 of FIG. 3).

In one configuration, the apparatus 1102/1102' for wireless communication includes means for receiving an uplink transmission from a second device. In some examples, the apparatus 1102/1102' may include means for relaying the uplink transmission to a base station. In some examples, the apparatus 1102/1102' may include means for providing an indication that the second device is an originating source of the uplink transmission when relaying the uplink transmission to the base station. In some examples, the apparatus 1102/1102' may include means for adding a label to the uplink transmission, the label identifying the second device as the originating source of the uplink transmission. In some examples, the apparatus 1102/1102' may include means for providing the label in a signal separate from the uplink transmission. In some examples, the apparatus 1102/1102' may include means for transmitting the uplink transmission using a set of resources allocated for transmissions for which the second device is the originating source. In some examples, the apparatus 1102/1102' may include means for scrambling a CRC portion with an identifier associated with the second device. In some examples, the apparatus 1102/1102' may include means for allocating different sets of resources for transmissions originating from different devices. In some examples, the apparatus 1102/1102' may include means for allocating the set of resources for transmissions for which the second device is the originating source based on a predefined rule. In some examples, the apparatus 1102/1102' may include means for allocating the set of resources for transmissions for which the second device is the originating source based on signaling provided by the base station. In some examples, the apparatus 1102/1102' may include means for allocating the set of resources for transmissions for which the second device is the originating source based on signaling provided by the first device. In some examples, the apparatus 1102/1102' may include means for transmitting an SR to the base station using a dedicated resource in response to receiving the uplink transmission from the second device. In some examples, the apparatus 1102/1102' may include means for receiving, from the base station and based on the SR, an order to transmit the uplink transmission. In some examples, the apparatus 1102/1102' may include means for transmitting the uplink transmission based on the received order to transmit. In some examples, the apparatus 1102/1102' may include means for determining a type of transmission associated with the uplink transmission. In some examples, the apparatus 1102/1102' may include means for transmitting the SR to the base station prior to the relaying of the uplink transmission based on the determined type of transmission. In some examples, the apparatus 1102/1102' may include means for determining a channel associated with the uplink transmission, and wherein the providing of the indication is based on the channel associated with the uplink transmission. In some examples, the apparatus 1102/1102' may include means for adding a label to the uplink transmission when the uplink transmission corresponds to a PUSCH. In some examples, the apparatus 1102/1102' may include means for transmitting the uplink transmission using a set of resources allocated for transmissions for which the second device is the originating source when the uplink transmission corresponds to a PUCCH. In some examples, the apparatus 1102/1102' may include means for determining a payload size associated with the uplink transmission, and wherein the providing of the indication is based on the payload size associated with the uplink transmission. In some examples, the apparatus 1102/1102' may include means for transmitting the uplink transmission using a set of resources allocated for transmissions for which the second device is the originating source when the payload size satisfies a size threshold. In some examples, the apparatus 1102/1102' may include means for adding a label to the uplink transmission when the payload size does not satisfy the size threshold. In some examples, the apparatus 1102/1102' may include means for determining a scheduling type associated with the uplink transmission, and wherein the providing of the indication is based on the scheduling type associated with the uplink transmission. In some examples, the apparatus 1102/1102' may include means for adding a label to the uplink transmission when the scheduling type corresponds to a grant-free uplink transmission. In some examples, the apparatus 1102/1102' may include means for transmitting the uplink transmission using a set of resources allocated for transmissions for which the second device is the originating source when the uplink scheduling type corresponds to a grant-based uplink transmission. In some examples, the apparatus 1102/1102' may include means for providing the indication via at least one of (a) adding a label to the uplink transmission, (b) transmitting the uplink transmission using a set of resources allocated for transmissions for which the second device is the originating source, or (c) transmitting an SR to the base station using a dedicated resource in response to the receiving of the uplink transmission from the second device.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 13:
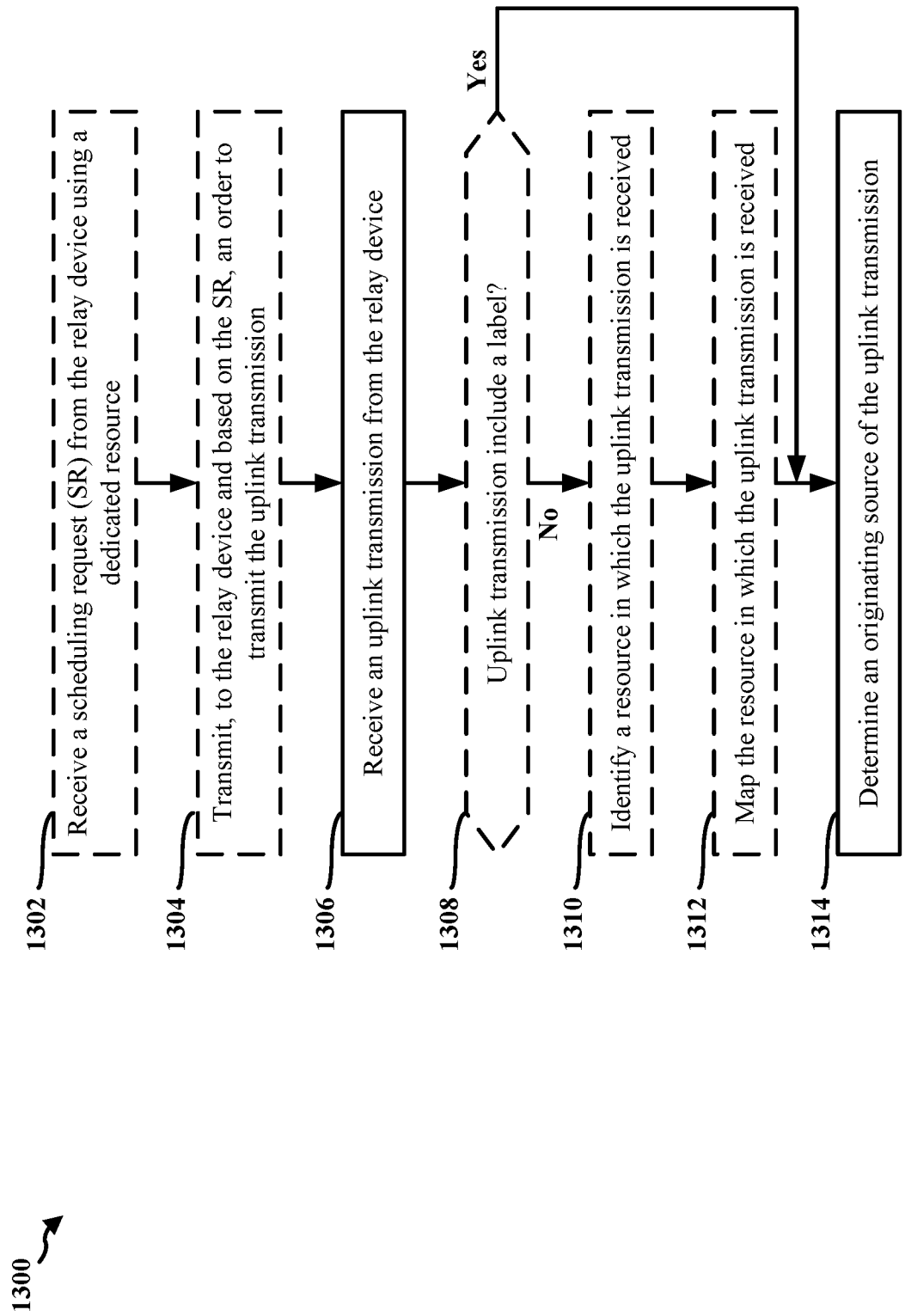
FIG. 13 is a flowchart of a method of wireless communication.

FIG. 13 is a flowchart 1300 of a method of wireless communication. The method may be performed by a base station (e.g., the base station 102, the base station 180, the base station 310, the base station 402, the base station 502, the base station 1160; the apparatus 1402/1402'; the base station relayed uplink transmission component 199; the processing system 1514, which may include the memory 376 and which may be the entire base station 310 or a component of the base station 310, such as the TX processor 316, the RX processor 370, and/or the controller/processor 375). The method may improve relayed uplink transmissions by distinguishing originating sources for received transmissions at a base station. Optional aspects are illustrated with a dashed line.

At 1302, the base station may receive an SR from a relay device using a dedicated resource. For example, an SR component 1406 of an apparatus 1402 of FIG. 14 may be configured to receive the SR from the relay device. The scheduling request may be using a dedicated resource associated with the device that is the originating source of the uplink transmission. In some examples, the base station may receive the SR from the relay device in response to the relay device receiving an uplink transmission that triggers the transmission of the SR.

At 1304, the base station may transmit, to the relay device and based on the SR, an order to transmit the uplink transmission. For example, a transmit order component 1408 of the apparatus 1402 may be configured to cause the base station to transmit the order to transmit the uplink transmission to the relay device.

At 1306, the base station receives an uplink transmission from the relay device. For example, a reception component 1404 of the apparatus 1402 may be configured to receive the uplink transmission from the relay device. In some examples, the base station may receive the uplink transmission in response to an order to transmit. In some examples, the base station may receive the uplink transmission from the relay device.

At 1308, the base station may determine whether the uplink transmission includes a label. For example, a label component 1410 of the apparatus 1402 may be configured to determine whether the received uplink transmission includes a label. In some examples, the label (or additional signaling) may be information (e.g., one or more bits) added to, for example, a header of the uplink transmission and/or appended to the uplink transmission. In some examples, the additional signaling may be a wrapper added to uplink transmission.

If, at 1308, the base station determines that the uplink transmission includes a label, then, at 1314, the base station determines an originating source of the uplink transmission, for example, based on the label. For example, a source component 1414 of the apparatus 1402 may be configured to determine the originating source of the uplink transmission. In some examples, the base station may use a source identifier associated with the originating source and identified based on the label to determine the original source of the uplink transmission. In some examples, the base station may determine the originating source of the received uplink transmission based on information added to the header of the uplink transmission, appended to the uplink transmission, and/or received in a signal separate from the uplink transmission. In some examples, the base station may determine the originating source of the received uplink transmission based on the presence or absence of the additional signaling. For example, if the uplink transmission does not include any additional signaling, then the base station may determine that the first device is the originating source of the uplink transmission. However, if the uplink transmission includes any additional signaling, then the base station may determine that another device (e.g., the second device) is the originating source of the uplink transmission.

In some examples, the additional signaling may explicitly indicate the originating source of the uplink transmission. For example, the additional signaling may indicate that the originating source is the first device, that the originating source is the second device, etc. In some examples, the additional signaling may indicate whether the uplink transmission is or is not a relayed uplink transmission and the base station may determine, based on the additional signaling, the originating source of the uplink transmission. For example, if the additional signaling indicates that the uplink transmission is not a relayed uplink transmission, then the base station may determine that the first device is the originating source of the uplink transmission. However, if the additional signaling indicates that the uplink transmission is a relayed uplink transmission, then the base station may determine, based on, for example, the quantity of other devices for which the first device is a relay device and/or additional provided information (e.g., an identifier associated with another device), the originating source of the uplink transmission.

If, at 1308, the base station determines that the uplink transmission does not include a label, then, at the 1310, the base station may identify a resource in which the uplink transmission was received. For example, a resources component 1412 of the apparatus 1402 may be configured to identify a resource in which the uplink transmission was received.

In some examples, the relay device may use different resources when transmitting the uplink transmission to distinguish the originating source of the uplink transmission. The different resources may include one or more of time resources, frequency resources, beam resources, spatial layer resources, and/or a scrambling sequence. Thus, different sets of resources may be assigned for uplink transmissions originating from different devices. For example, a first set of resources may be allocated for transmissions for which the first device is the originating source of the uplink transmission, a second set of resources may be allocated for transmissions for which the second device is the originating source of the uplink transmission, etc. In some examples, a set of resources may include any suitable quantity and/or division of available resources.

In some examples, the resource used for transmitting the uplink transmission may correspond to the dedicated resource with which the SR is received.

In some examples in which the relay device uses different resources when transmitting the uplink transmission, the base station may determine the originating source of the uplink transmission based on the resource(s) associated with the received uplink transmission. For example, the base station may identify a resource(s) used for the transmission of the uplink transmission and then map the identified resource(s) to a corresponding device (e.g., the first device, the second device, etc.).

In some examples, the relay device may scramble the uplink transmission with an identifier associated with the originating source. The base station may then determine the originating source of the uplink transmission based on the identifier after decoding the received uplink transmission. For example, the relay device may use a sequence to scramble at least a portion of the uplink transmission, and the set of resources allocated for transmissions for which a particular device is the originating source of the uplink transmission include scrambling a cyclic redundancy check (CRC) portion with an identifier associated with the particular device.

At 1312, the base station may map the identified resource to an identifier (e.g., a source identifier) based on a set of resources allocated for transmissions for which the respective device is the originating source. For example, the resources component 1412 of the apparatus 1402 may be configured to map the resource in which the uplink transmission is received to the identifier.

At 1314, the base station determines the originating source of the uplink transmission. For example, the source component 1414 of the apparatus 1402 may be configured to determine the originating source of the uplink transmission based on a source identifier determined via a label, a dedicated resource, and/or an identified resource.

Figure 14:
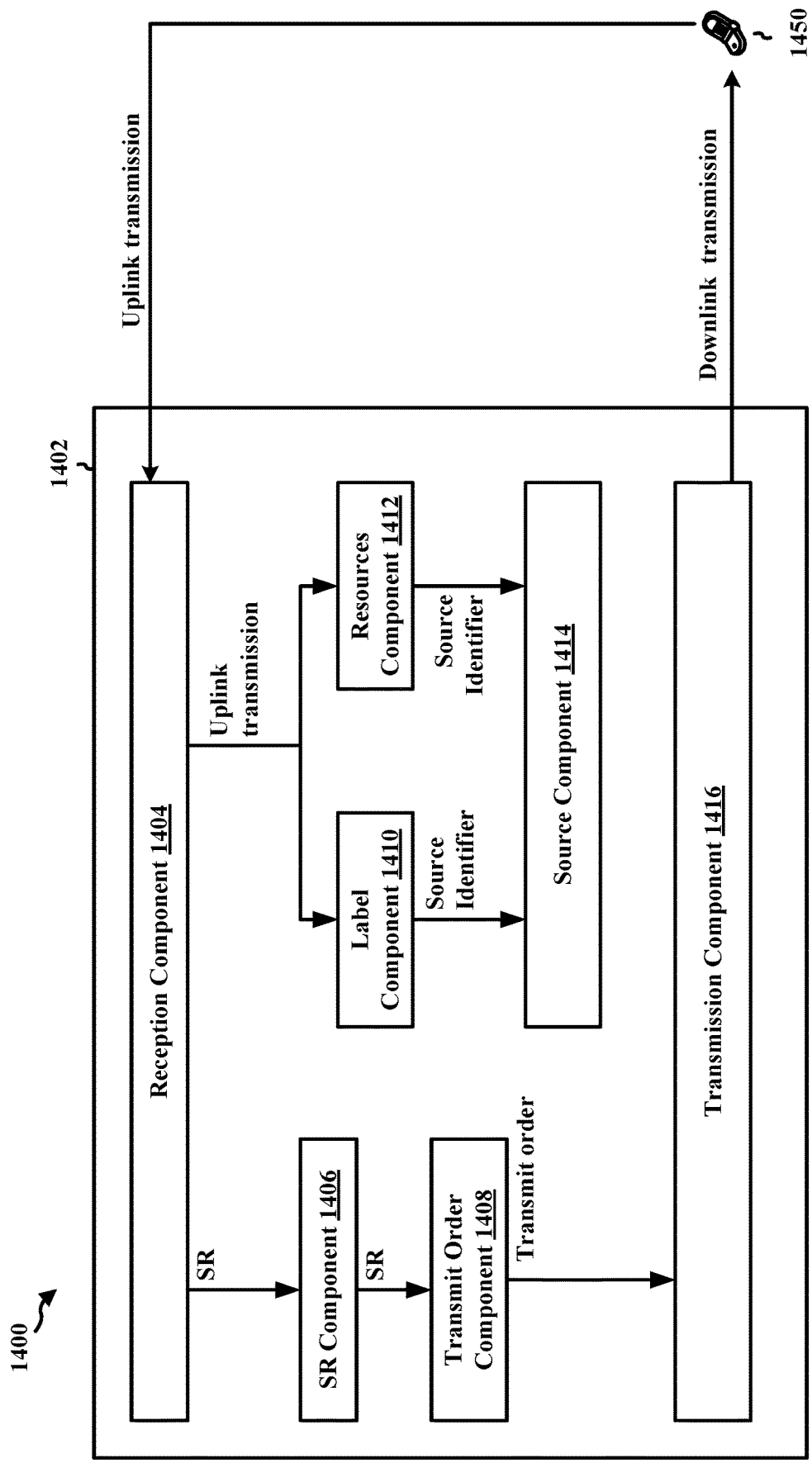
FIG. 14 is a conceptual data flow diagram illustrating the data flow between different means/components in an example apparatus.

FIG. 14 is a conceptual data flow diagram 1400 illustrating the data flow between different means/components in an example apparatus 1402 in connection with a UE 1450. The apparatus may be a base station or a component of a base station. The apparatus 1402 may be configured to perform the method of flowchart 1300 of FIG. 13. The apparatus includes a reception component 1404, an SR component 1406, a transmit order component 1408, a label component 1410, a resources component 1412, a source component 1414, and a transmission component 1416. The UE 1450 may include the same or similar components as shown with respect to the apparatus 1102.

The reception component 1404 may be configured to receive various types of signals/messages and/or other information from other devices including the UE 1450. The messages/information may be received via the reception component 1404 and provided to one or more components of the apparatus 1402 for further processing and use in performing various operations (e.g., as described in connection with 1302 and/or 1306).

The SR component 1406 may be configured to receive an SR from the UE 1450 using a dedicated resource associated with the originating source of the uplink transmission (e.g., as described in connection with 1302).

The transmit order component 1408 may be configured to cause the apparatus 1402 to transmit an order for transmission of the uplink transmission based on the SR (e.g., as described in connection with 1304).

The label component 1410 may be configured to determine whether the uplink transmission includes a label and/or determine a source identifier associated with the label (e.g., as described in connection with 1306).

The resources component 1412 may be configured to identify a resource used for transmitting the uplink transmission and/or to map the identified resource to a source identifier (e.g., as described in connection with 1308).

The source component 1414 may be configured to determine the originating source of the uplink transmission based on, for example, the source identifier (e.g., as described in connection 1310 and/or 1312).

The transmission component 1416 may be configured to transmit signals to one or more external devices including, for example, the UE 1450, in accordance with the aspects described herein. In various configurations, the signals and/or information may be transmitted by the transmission component 1416 in accordance with the methods discussed supra including the methods of flowchart of FIG. 13 (e.g., as described in connection with 1304).

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
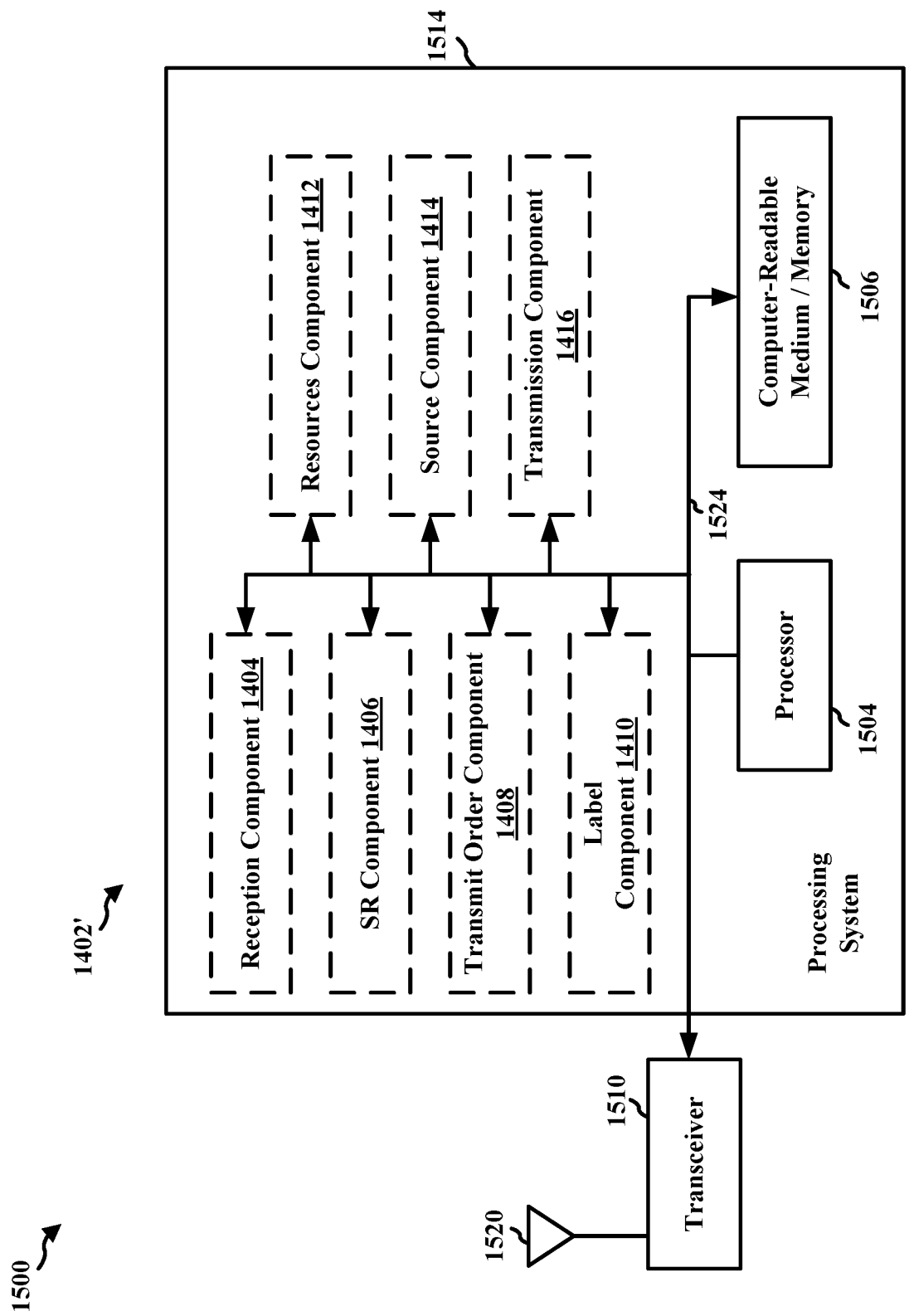
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1416, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see the base station 310 of FIG. 3).

In one configuration, the apparatus 1402/1402' for wireless communication includes means for receiving an uplink transmission from a first device. In some examples, the apparatus 1402/1402' may include means for determining an originating source of the uplink transmission, wherein the originating source is a second device different than the first device. In some examples, the apparatus 1402/1402' may include means for identifying the second device as the originating source of the uplink transmission from an indication comprised in at least one of a header of the uplink transmission or information appended to the uplink transmission. In some examples, the apparatus 1402/1402' may include means for identifying a resource in which the uplink transmission is received. In some examples, the apparatus 1402/1402' may include means for mapping the resource in which the uplink transmission is received from the first device to the second device. In some examples, the apparatus 1402/1402' may include means for scrambling a CRC portion with an identifier associated with the second device. In some examples, the apparatus 1402/1402' may include means for identifying the identifier associated with the second device after decoding the received uplink transmission. In some examples, the apparatus 1402/1402' may include means for allocating different sets of resources for transmissions originating from the different devices based on a predefined rule. In some examples, the apparatus 1402/1402' may include means for allocating the different sets of resources based on signaling provided by the base station to the first device. In some examples, the apparatus 1402/1402' may include means for allocating the different sets of resources for transmissions for which the second device is the originating source are based on signaling provided by the first device. In some examples, the apparatus 1402/1402' may include means for receiving an SR from the first device using a dedicated resource. In some examples, the apparatus 1402/1402' may include means for transmitting, to the first device and based on the SR, an order to transmit the uplink transmission. In some examples, the apparatus 1402/1402' may include means for receiving the uplink transmission relayed for the second device based on the received order to transmit. In some examples, the apparatus 1402/1402' may include means for determining the originating source of the uplink transmission via at least one of (a) identifying the second device as the originating source of the uplink transmission from an indication comprised in at least one of a header of the uplink transmission or information appended to the uplink transmission, (b) mapping a resource in which the uplink transmission is received from the first device to the second device, or (c) receiving an SR from the first device using a dedicated resource.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a first device, comprising: receiving an uplink transmission from a second device; relaying the uplink transmission to a base station; and providing an indication that the second device is an originating source of the uplink transmission when relaying the uplink transmission to the base station.

In Example 2, the method of Example 1 further includes that the providing the indication includes adding a label to the uplink transmission, the label identifying the second device as the originating source of the uplink transmission.

In Example 3, the method of any of Example 1 or Example 2 further includes that the label is comprised in at least one of a header of the uplink transmission or information appended to the uplink transmission.

In Example 4, the method of any of Examples 1 to 3 further includes that the label is provided in a signal separate from the uplink transmission.

In Example 5, the method of any of Examples 1 to 4 further includes that the providing the indication includes transmitting the uplink transmission using a set of resources allocated for transmissions for which the second device is the originating source.

In Example 6, the method of any of Examples 1 to 5 further includes that the set of resources allocated for transmission for which the second device is the originating source include at least one of time resources, frequency resources, beam resources, spatial layer resources, or a scrambling sequence.

In Example 7, the method of any of Examples 1 to 6 further includes that a sequence is used to scramble at least a portion of the uplink transmission, and the set of resources allocated for transmissions for which the second device is the originating source include scrambling a cyclic redundancy check (CRC) portion with an identifier associated with the second device.

In Example 8, the method of any of Examples 1 to 7 further includes that different sets of resources are allocated for transmissions originating from different devices.

In Example 9, the method of any of Examples 1 to 8 further includes that the set of resources are allocated for transmissions for which the second device is the originating source based on a predefined rule, and wherein the predefined rule is based on a temporal relationship with a downlink transmission.

In Example 10, the method of any of Examples 1 to 9 further includes that the set of resources are allocated for transmissions for which the second device is the originating source based on signaling provided by the base station.

In Example 11, the method of any of Examples 1 to 10 further includes the set of resources are allocated for transmissions for which the second device is the originating source based on signaling provided by the first device, and wherein the signaling includes a device indication or a device report.

In Example 12, the method of any of Examples 1 to 11 further includes: transmitting a scheduling request (SR) to the base station using a dedicated resource in response to receiving the uplink transmission from the second device; receiving, from the base station and based on the SR, an order to transmit the uplink transmission; and transmitting the uplink transmission based on the received order to transmit.

In Example 13, the method of any of Examples 1 to 12 further includes that the uplink transmission relayed by the first device comprises a beam failure recovery request for a downlink base station beam of the second device.

In Example 14, the method of any of Examples 1 to 13 further includes that the uplink transmission relayed by the first device comprises a beam failure report for the second device, wherein the beam failure report includes at least one of a failed component carrier index or a new candidate beam index.

In Example 15, the method of any of Examples 1 to 14 further includes: determining a type of transmission associated with the uplink transmission; and transmitting the SR to the base station prior to the relaying of the uplink transmission based on the determined type of transmission.

In Example 16, the method of any of Examples 1 to 15 further includes: determining a channel associated with the uplink transmission, and wherein the providing of the indication is based on the channel associated with the uplink transmission and includes: adding a label to the uplink transmission when the uplink transmission corresponds a physical uplink shared channel (PUSCH); and transmitting the uplink transmission using a set of resources allocated for transmissions for which the second device is the originating source when the uplink transmission corresponds to a physical uplink control channel (PUCCH).

In Example 17, the method of any of Examples 1 to 16 further includes: determining a payload size associated with the uplink transmission, and wherein the providing of the indication is based on the payload size associated with the uplink transmission and includes: transmitting the uplink transmission using a set of resources allocated for transmissions for which the second device is the originating source when the payload size satisfies a size threshold; and adding a label to the uplink transmission when the payload size does not satisfy the size threshold.

In Example 18, the method of any of Examples 1 to 17 further includes: determining a scheduling type associated with the uplink transmission, and wherein the providing of the indication is based on the scheduling type associated with the uplink transmission and includes: adding a label to the uplink transmission when the scheduling type corresponds to a grant-free uplink transmission, wherein a grant-based uplink transmission is scheduled via downlink signaling; and transmitting the uplink transmission using a set of resources allocated for transmissions for which the second device is the originating source when the scheduling type corresponds to the grant-based uplink transmission, and wherein the set of resources are identified in the downlink signaling.

In Example 19, the method of any of Examples 1 to 18 further includes that the providing the indication includes at least one of (a) adding a label to the uplink transmission, (b) transmitting the uplink transmission using a set of resources allocated for transmissions for which the second device is the originating source, or (c) transmitting a scheduling request (SR) to the base station using a dedicated resource in response to the receiving of the uplink transmission from the second device.

Example 20 is a device including one or more processors and one or more memories in electronic communication with the one or more processors storing instructions executable by the one or more processors to cause a system or an apparatus to implement a method as in any of Examples 1 to 19.

Example 21 is a system or apparatus including means for implementing a method or realizing an apparatus as in any of Examples 1 to 19.

Example 22 is a non-transitory computer-readable medium storing instructions executable by one or more processors to cause the one or more processors to implement a method as in any of Examples 1 to 19.

Example 23 is a method of wireless communication at a base station, comprising: receiving an uplink transmission from a first device; and determining an originating source of the uplink transmission, wherein the originating source is a second device different than the first device.

In Example 24, the method of Example 23 further includes that the determining of the originating source of the uplink transmission includes: identifying the second device as the originating source of the uplink transmission from an indication comprised in at least one of a header of the uplink transmission or information appended to the uplink transmission.

In Example 25, the method of Example 23 or Example 24 further includes that the determining of the originating source of the uplink transmission includes: identifying a resource in which the uplink transmission is received; and mapping the resource in which the uplink transmission is received from the first device to the second device.

In Example 26, the method of any of Examples 23 to 25 further includes that the resource used to identify the second device includes at least one of a time resource, a frequency resource, a beam resource, a spatial layer resource, or a scrambling sequence.

In Example 27, the method of any of Examples 23 to 26 further includes that a sequence is used to scramble at least a portion of the uplink transmission, and resource allocated for transmission for which the second device is the originating source include scrambling the portion with an identifier associated with the second device, and further comprises identifying the identifier associated with the second device after decoding the received uplink transmission.

In Example 28, the method of any of Examples 23 to 27 further includes that different sets of resources are allocated for transmissions originating from the different devices based on a predefined rule, and wherein the predefined rule is based on a temporal relationship with a downlink transmission from the base station.

In Example 29, the method of any of Examples 23 to 28 further includes that the different sets of resources are allocated based on signaling provided by the base station to the first device.

In Example 30, the method of any of Examples 23 to 29 further includes that set of resources allocated for transmissions for which the second device is the originating source is based on signaling provided by the first device.

In Example 31, the method of any of Examples 23 to 30 further includes: receiving a scheduling request (SR) from the first device using a dedicated resource; transmitting, to the first device and based on the SR, an order to transmit the uplink transmission; and receiving the uplink transmission relayed for the second device based on the order.

In Example 32, the method of any of Examples 23 to 31 further includes that the uplink transmission received from the first device comprises a beam failure recovery request for a downlink base station beam of the second device.

In Example 33, the method of any of Examples 23 to 32 further includes that the uplink transmission received from the first device comprises a beam failure report for the second device, wherein the beam failure report includes at least one of a failed component carrier index or a new candidate beam index.

Example 34 is a device including one or more processors and one or more memories in electronic communication with the one or more processors storing instructions executable by the one or more processors to cause a system or an apparatus to implement a method as in any of Examples 23 to 33.

Example 35 is a system or apparatus including means for implementing a method or realizing an apparatus as in any of Examples 23 to 33.

Example 36 is a non-transitory computer-readable medium storing instructions executable by one or more processors to cause the one or more processors to implement a method as in any of Examples 23 to 33.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first device comprising:
    relaying the uplink transmission to a base station;
    determining at least one of a channel type associated with the uplink transmission, a payload size associated with the uplink transmission, or a scheduling type associated with the uplink transmission; receiving an uplink transmission from a second device and
    providing an indication that the second device is an originating source of the uplink transmission when relaying the uplink transmission to the base station, wherein the indication is provided based on at least one of the channel type associated with the uplink transmission, the payload size associated with the uplink transmission, or the scheduling type associated with the uplink transmission.

2. The method of claim 1, wherein the providing the indication includes adding a label to the uplink transmission, the label identifying the second device as the originating source of the uplink transmission.

3. The method of claim 2, wherein the label is comprised in at least one of a header of the uplink transmission or information appended to the uplink transmission.

4. The method of claim 2, wherein the label is provided in a signal separate from the uplink transmission.

5. The method of claim 1, wherein the providing the indication includes transmitting the uplink transmission using a set of resources allocated for transmissions for which the second device is the originating source.

6. The method of claim 5, wherein the set of resources allocated for transmission for which the second device is the originating source include at least one of time resources, frequency resources, beam resources, spatial layer resources, or a scrambling sequence.

7. The method of claim 5, wherein a sequence is used to scramble at least a portion of the uplink transmission, and the set of resources allocated for transmissions, for which the second device is the originating source, include scrambling a cyclic redundancy check (CRC) portion with an identifier associated with the second device.

8. The method of claim 5, wherein different sets of resources are allocated for transmissions originating from different devices.

9. The method of claim 5, wherein the set of resources are allocated for transmissions for which the second device is the originating source based on a predefined rule, and wherein the predefined rule is based on a temporal relationship with a downlink transmission.

10. The method of claim 5, wherein the set of resources are allocated for transmissions, for which the second device is the originating source, based on signaling provided by the base station.

11. The method of claim 5, wherein the set of resources are allocated for transmissions for which the second device is the originating source based on signaling provided by the first device, and wherein the signaling includes a device indication or a device report.

12. The method of claim 1, further comprising:
    transmitting a scheduling request (SR) to the base station using a dedicated resource in response to receiving the uplink transmission from the second device;
    receiving, from the base station and based on the SR an order to transmit the uplink transmission; and
    transmitting the uplink transmission based on the received order to transmit.

13. The method of claim 12, wherein the uplink transmission relayed by the first device comprises a beam failure recovery request for a downlink base station beam of the second device.

14. The method of claim 12, wherein the uplink transmission relayed by the first device comprises a beam failure report for the second device, wherein the beam failure report includes at least one of a failed component carrier index or a new candidate beam index.

15. The method of claim 12, further comprising:
determining a type of transmission associated with the uplink transmission;
and transmitting the SR to the base station prior to the relaying of the uplink transmission based on the determined type of transmission.

16. The method of claim 1,
wherein the providing of the indication based on the channel type associated with the uplink transmission comprises:
adding a label to the uplink transmission when the uplink transmission corresponds to a physical uplink shared channel (PUSCH); and
transmitting the uplink transmission using a set of resources allocated for transmissions for which the second device is the originating source when the uplink transmission corresponds to a physical uplink control channel (PUCCH).

17. The method of claim 1,
wherein the providing of the indication based on the payload size associated with the uplink transmission comprises:
transmitting the uplink transmission using a set of resources allocated for transmissions for which the second device is the originating source when the payload size satisfies a size threshold; and
adding a label to the uplink transmission when the payload size does not satisfy the size threshold.

18. The method of claim 1,
wherein the providing of the indication based on the scheduling type associated with the uplink transmission comprises:
adding a label to the uplink transmission when the scheduling type corresponds to a grant-free uplink transmission, wherein a grant-based uplink transmission is scheduled via downlink signaling; and
transmitting the uplink transmission using a set of resources allocated for transmissions for which the second device is the originating source when the scheduling type corresponds to the grant-based uplink transmission, and wherein the set of resources are identified in the downlink signaling.

19. The method of claim 1, wherein the providing the indication includes at least one of (a) adding a label to the uplink transmission, (b) transmitting the uplink transmission using a set of resources allocated for transmissions for which the second device is the originating source, or (c) transmitting a scheduling request (SR) to the base station using a dedicated resource in response to the receiving of the uplink transmission from the second device.

20. A method of wireless communication at a base station, comprising:
receiving an uplink transmission from a first device; and
determining an originating source of the uplink transmission, wherein the originating source is a second device different than the first device, wherein the determination of the originating source is based on an indication, wherein the indication is based on at least one of a channel type associated with the uplink transmission, a payload size associated with the uplink transmission, or a scheduling type associated with the uplink transmission.

21. The method of claim 20, wherein the determining of the originating source of the uplink transmission includes:
identifying the second device as the originating source of the uplink transmission from the indication, wherein the indication is comprised in at least one of a header of the uplink transmission or information appended to the uplink transmission.

22. The method of claim 20, wherein the determining of the originating source of the uplink transmission includes:
identifying a resource in which the uplink transmission is received; and
mapping the resource in which the uplink transmission is received from the first device to the second device.

23. The method of claim 22, wherein the resource used to identify the second device includes at least one of a time resource, a frequency resource, a beam resource, a spatial layer resource, or a scrambling sequence.

24. The method of claim 22, wherein a sequence is used to scramble at least a portion of the uplink transmission, and resource allocated for transmission, for which the second device is the originating source, include scrambling the portion with an identifier associated with the second device, and further comprises identifying the identifier associated with the second device after decoding the received uplink transmission.

25. The method of claim 22, wherein different sets of resources are allocated for transmissions originating from the different devices based on a predefined rule, and wherein the predefined rule is based on a temporal relationship with a downlink transmission from the base station.

26. The method of claim 25, wherein the different sets of resources are allocated based on signaling provided by the base station to the first device.

27. The method of claim 22, wherein a set of resources allocated for transmissions for which the second device is the originating source is based on signaling provided by the first device.

28. The method of claim 20, further comprising:
receiving a scheduling request (SR) from the first device using a dedicated resource;
transmitting, to the first device and based on the SR, an order to transmit the uplink transmission; and
receiving the uplink transmission relayed for the second device based on the order.

29. The method of claim 28, wherein the uplink transmission received from the first device comprises a beam failure recovery request for a downlink base station beam of the second device.

30. The method of claim 28, wherein the uplink transmission received from the first device comprises a beam failure report for the second device, wherein the beam failure report includes at least one of a failed component carrier index or a new candidate beam index.

* * * * *